(12) United States Patent
Yan et al.

(10) Patent No.: US 7,974,604 B2
(45) Date of Patent: Jul. 5, 2011

(54) METHOD OF AUTHENTICATION IN IP MULTIMEDIA SUBSYSTEM

(75) Inventors: Jun Yan, Shenzhen (CN); Ying Wang, Shenzhen (CN); Chengdong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 908 days.

(21) Appl. No.: 11/842,668

(22) Filed: Aug. 21, 2007

(65) Prior Publication Data

US 2008/0020789 A1   Jan. 24, 2008

Related U.S. Application Data

(63) Continuation of application No. PCT/CN2006/001569, filed on Jul. 5, 2006.

(30) Foreign Application Priority Data

Jul. 5, 2005  (CN) .......................... 2005 1 0082907
Aug. 19, 2005  (CN) .......................... 2005 1 0093216
Oct. 18, 2005  (CN) .......................... 2005 1 0109162

(51) Int. Cl.
    *H04M 1/66*   (2006.01)
(52) U.S. Cl. ............... 455/411; 455/410; 455/435.1; 455/466; 370/338; 370/352; 370/401
(58) Field of Classification Search .......... 455/410–411, 455/435.1, 432.3, 466; 370/328, 338, 352–356, 370/401
See application file for complete search history.

(56) References Cited

U.S. PATENT DOCUMENTS 6,859,651 B2 *  2/2005  Gabor .......................... 455/411
6,954,654 B2 * 10/2005  Ejzak .......................... 455/560
7,583,963 B2 *  9/2009  Tammi et al. ............. 455/435.1
7,650,149 B2 *  1/2010  Tammi et al. ............. 455/435.2

(Continued)

FOREIGN PATENT DOCUMENTS

CN   100395976 C   6/2008

(Continued)

OTHER PUBLICATIONS

Jun, "Some comments and Proposal on IMS Authentication Bundles with NASS," Contribution to ETSI TISPAN #7 (Jul. 11, 2005).

(Continued)

*Primary Examiner* — Sharad Rampuria
(74) *Attorney, Agent, or Firm* — Leydig, Voit & Mayer, Ltd.

(57) ABSTRACT

A method of authentication in an IMS includes: after receiving a Register message from a UE, locating, by a P-CSCF, a CLF according to information contained in the Register message and a pre-configured relationship; querying, by the P-CSCF, the CLF about NASS attachment information of the UE to obtain a query result, and sending the Register message carrying the query result to an I-CSCF; forwarding, by the I-CSCF, the Register message carrying the query result to a S-CSCF assigned by a UPSF or the HSS; authenticating the UE and sending an authentication result to the UE by the S-CSCF. In embodiments of the present invention, the UPSF or the HSS in the service layer determines the authentication mechanism of the user, and the S-CSCF implements the authentication, which is more reasonable. Embodiments of the present invention also provide combinations of NBA with other authentication mechanisms, thereby guarantees the authentication of the user after the NBA authentication fails.

20 Claims, 21 Drawing Sheets

U.S. PATENT DOCUMENTS

| | | | |
|---|---|---|---|
| 7,831,247 B2 * | 11/2010 | Gabor et al. | 455/422.1 |
| 2003/0186681 A1 | 10/2003 | Gabor | |
| 2004/0158735 A1 | 8/2004 | Roese | |
| 2004/0184432 A1 | 9/2004 | Gateva et al. | |
| 2005/0060411 A1 | 3/2005 | Coulombe et al. | |
| 2007/0140493 A1 | 6/2007 | Kröselberg | |
| 2007/0143834 A1 * | 6/2007 | Leinonen et al. | 726/5 |
| 2008/0031227 A1 * | 2/2008 | Wang | 370/352 |
| 2008/0039085 A1 * | 2/2008 | Phan-Anh | 455/435.1 |
| 2008/0155658 A1 * | 6/2008 | Leinonen et al. | 726/4 |
| 2010/0154029 A1 * | 6/2010 | Fernandez Alonso et al. | 726/1 |

FOREIGN PATENT DOCUMENTS

| | | |
|---|---|---|
| CN | 100442926 C | 12/2008 |
| EP | 1365620 A1 | 11/2003 |
| EP | 1 414 212 A1 | 4/2004 |
| EP | 1414212 A1 * | 4/2004 |
| WO | WO 2004/036391 A2 | 4/2004 |
| WO | WO 2005/039141 A1 | 4/2005 |

OTHER PUBLICATIONS

Nokia, "IMS-NASS Bundles Authentication," 3GPP TSG SA WG3 Security (Sep. 5, 2005).

$1^{st}$ Office Action in corresponding Chinese Application No. 200680010294.X (Feb. 5, 2010).

$1^{st}$ Office Action in corresponding European Application No. 06753103.8 (Sep. 16, 2008).

$2^{nd}$ Office Action in corresponding European Application No. 06753103.8 (Apr. 28, 2009).

Summons to attend oral proceedings in corresponding European Application No. 06753103.8 (Dec. 11, 2008).

Written Opinion of the International Searching Authority in corresponding PCT Application No. PCT/CN2006/001569 (Nov. 9, 2006).

"ETSI TSIPAN#06Bis—NASS-IMS bundled authentication mechanism," Jun. 6-10, 2005, France Télécom, Valbonne, France.

* cited by examiner

METHOD OF AUTHENTICATION IN IP MULTIMEDIA SUBSYSTEM

This application is a continuation of International Patent Application No. PCT/CN2006/001569, filed Jul. 5, 2006, which claims priority to Chinese Patent Application No. 200510082907.8, filed Jul. 5, 2005, Chinese Patent Application No. 200510093216.8, filed Aug. 19, 2005, and Chinese Patent Application No. 200510109162.X, filed Oct. 18, 2005, all of which are hereby incorporated by reference.

FIELD OF THE INVENTION

The present invention relates to an IP Multimedia Subsystem (IMS), and more particularly, to a method of authentication in the IMS.

BACKGROUND OF THE INVENTION

A Next Generation Network (NGN) as well as a mobile network may generally be divided into an access network and a service network. A user may access to an IP network via the access network provided an access network operator, and then enjoy different services such as voice, video, stream media, etc., through service networks provided one or multiple service network operators.

When the access network and the service network belong to different operators, authentications of the user in the access network and the service network are independent. In such a scenario, the user needs two types of authentications before enjoying the service. One authentication is in the access layer; after the authentication in the access layer succeeds, the user is able to access to the NGN network. The other authentication is in the service layer; and after the authentication in the service layer succeeds, the user is able to enjoy the services provided by the service network.

When the service network and the access network belong to the same operator, or when there exists cooperation between the access network operator and the service network operator, the service network operator may bind the authentication in the service layer with that in the access layer under some networking scenarios. In other words, the user is regarded to be legal after the authentication in the access layer succeeds, and the authentication in the service layer is no longer required.

In the IMS access layer, an Authentication and Key Agreement (AKA) scheme is usually employed for the authentication of the UE in the IMS service layer.

Referring to FIG. 1, the IMS AKA scheme includes:

Block s101: a User Equipment (UE) sends a Register message to a Proxy-Call Session Control Function (P-CSCF).

Block s102: The P-CSCF, acting as a Session Initial Protocol (SIP) proxy server, forwards the Register message of the UE to an Interrogating-CSCF (I-CSCF).

Block s103: The I-CSCF interacts with a Home Subscriber Server (HSS) through a Cx-Selection-Info message to select a corresponding Service-CSCF (S-CSCF), i.e., the I-CSCF sends a request to the HSS to search a user profile in the HSS to select the S-CSCF for processing the Register message.

Block s104: The I-CSCF forwards the Register message of the UE to the S-CSCF selected in the Block s103.

Block s105: The S-CSCF sends a Cx-Put message to the HSS to update S-CSCF indication information in the HSS and notify the HSS that it has been assigned to serve this user.

Block s106: The S-CSCF sends an AV-Req message to the HSS requesting an authentication vector of the user.

Block s107: The HSS returns an AV-Req-Resp message to the S-CSCF carrying the authentication vector of the user.

Block s108: The S-CSCF determines that the UE needs to be authenticated according to the authentication vector received in Block s107 and the Register message of the UE, then the S-CSCF sends a 4xx Auth_Challenge message containing authentication-relevant information indicating that the UE needs to be authenticated to the I-CSCF. The 4xx denotes a kind of error and the xx stands for a number within 00~99.

Block s109: The I-CSCF forwards the 4xx Auth_Challenge message to the P-CSCF.

Block s110: The P-CSCF forwards the 4xx Auth_Challenge message to the UE.

Block s111: after receiving the 4xx Auth_Challenge message, the UE sends another Register message to the P-CSCF, at this time, the Register message carries an authentication parameter.

Block s112: The P-CSCF forwards the Register message of the UE to the I-CSCF.

Block s113: after receiving the Register message, the I-CSCF sends a Cx-Query message to the HSS to determine the S-CSCF for processing the Register message, i.e., the I-CSCF queries the HSS about the S-CSCF which has been assigned to serve this user. The HSS returns the S-CSCF name which was previously selected to the I-CSCF according to the S-CSCF indication information stored in the HSS.

Block s114: The I-CSCF forwards the Register message to the S-CSCF determined in the Block s113.

Block s115: The S-CSCF sends a Cx-Put message to the HSS to update the S-CSCF indication information in the HSS and notify the HSS that it has been assigned to serve this user.

Block s116: The S-CSCF downloads a user profile from the HSS through a Cx-Pull message.

Block s117: The S-CSCF authenticates the UE according to the user profile and the authentication parameter in the Register message of the UE. If the authentication succeeds, the S-CSCF sends a 2xx Auth_OK message to the I-CSCF indicating that the registration succeeds, wherein the 2xx indicates that the message is success relevant, and the xx is a number within 00~99. If the authentication fails, the S-CSCF sends an authentication failure message indicating that the authentication is failed to the I-CSCF.

Block s118: if the authentication succeeds, the I-CSCF forwards the 2xx Auth_OK message to the P-CSCF. If the authentication fails, the I-CSCF forwards the authentication failure message to the P-CSCF.

Block s119: if the authentication succeeds, the P-CSCF forwards the 2xx Auth_OK message to the UE. If the authentication fails, the P-CSCF forwards the authentication failure message to the UE.

France Telecom has put forward a Network Attach Sub System (NASS) Bundled Authentication (NBA) scheme to implement IMS-NASS bundled authentication at the Telecommunications and Internet Converged Services and Protocols for Advanced Networking (TISPAN) #6bis. In the NBA scheme, a Connection Location Function (CLF) in the NASS holds a bundled indication and a corresponding relationship between an IP address of the UE and association information of the UE in the access network. Each connection of the user holds one piece of association information.

Referring to FIG. 2, the NBA scheme includes:

Block s201: The UE sends a Register message to the P-CSCF.

Block s202: The P-CSCF queries the CLF about NASS attachment information of the UE according to a source IP address of the Register message, wherein the NASS attachment information contains the association information of the UE and the bundled indication.

Block s203: The P-CSCF compares the association information and an IP Multimedia Private Identity (IMPI) in an authentication header of the Register message. If the association information is consistent with the IMPI, it means that the authentication in the IMS service layer succeeds, proceed to Block s205; otherwise, it means that the authentication in the IMS service layer is failed, proceed to Block s204 to send a 403 Forbidden to the UE.

Block s205: The P-CSCF forwards the Register message carrying an indicator indicating whether the authentication succeeds to the I-CSCF.

Block s206: The I-CSCF interacts with the HSS through a Cx-Selection-Info message to select a corresponding S-CSCF, i.e., the I-CSCF sends a request to the HSS to search the user profile in the HSS to select the S-CSCF for processing the Register message.

Block s207: The I-CSCF forwards the Register message to the S-CSCF selected in the Block s206.

Block s208: after confirming that the user has successfully registered, without requesting the HSS for the authentication vector of the user, the S-CSCF sends a Cx-Put message to the HSS to update the S-CSCF indication information in the HSS and notify the HSS that it has been assigned to serve this user, and downloads the user profile from the HSS through a Cx-Pull message.

Block s209: The S-CSCF returns a 2xx Auth_OK message to the I-CSCF indicating that the authentication succeeds.

Block s210: The I-CSCF forwards the 2xx Auth_OK message to the P-CSCF.

Block s211: The P-CSCF forwards the 2xx Auth_OK message to the UE.

In the above scheme, the IMPI contained in the Register message is required to be consistent with the association information, i.e., the IMPI in the service layer and the association information in the access layer are the same identity. However, the service network operator is usually not the same with the access network operator. Thus the requirement of using the same identity for the service network operator and the access network operator restricts the flexibility of network applications. Moreover, it is unreasonable that the bundled indication is saved in the NASS. The reasonable method should be that the bundled indication is saved in the service layer (e.g., the HSS), while the access layer is only responsible for providing relevant information. Further, it is also unreasonable for the P-CSCF to implement the authentication. It may be more reasonable that the S-CSCF in a home network implements the authentication in the service layer, and the P-CSCF only provides relevant information of the authentication.

Further, when the state of the user changes, e.g., the user may employ different terminals when in different locations, the authentication adopting the IMS authentication bundled with NASS, which is configured as a default authentication mechanism, will fail. Thus the quality of service is decreased. Therefore, a second authentication mechanism pre-configured in the HSS is required to authenticate the user. However, there are no such solutions in the related art.

SUMMARY OF THE INVENTION

Embodiments of the present invention provide a method of authentication in an IP Multimedia Subsystem (IMS) in which an authentication mechanism is determined by a service layer, so as to guarantee retral-compatibility and maintainability of the authentication.

According to one aspect of the present invention, the method of authentication in the IMS includes:

after receiving a Register message from a User Equipment (UE), locating, by a Proxy-Call Session Control Function (P-CSCF), a Connection Location Function (CLF) according to information contained in the Register message and a pre-configured corresponding relationship between the information contained in the Register message and the CLF;

querying, by the P-CSCF, the CLF about Network Attach Sub System (NASS) information of the UE in an access network to obtain a query result, and sending the Register message carrying the query result to an Interrogating-Call Session Control Function (I-CSCF);

forwarding, by the I-CSCF, the Register message carrying the query result to a Service-Call Session Control Function (S-CSCF);

authenticating, by the S-CSCF, the UE according to an authentication mechanism obtained from a User Profile Service Function (UPSF) or a Home Subscriber Server (HSS), and sending an authentication result to the UE.

It can be seen from the above technical solution that, in the method provided by embodiments of the present invention, the UPSF or the HSS determines the authentication mechanism of the user and the S-CSCF implements the authentication, which is in accordance with the principle of implementing the authentication in the service layer and may be more reasonable. Compared with the related art, the technical solution provided by the embodiments of the present invention requires little modification to the existing IMS AKA procedure, thereby is more applicable and flexible, and more compatible with the existing IMS AKA.

Additionally, the UPSF or the HSS pre-stores the authentication mechanism of the user. Thus, the user may be provided with different kinds of combinations of authentication mechanisms.

DETAILED DESCRIPTION OF THE INVENTION

In order to make the technical solution and merits of the present invention clearer, a detailed description of the present invention is hereinafter given with reference to accompanying drawings and preferred embodiments.

A first embodiment of the present invention is based on the IMS AKA scheme, provides a method of IMS authentication bundled with NASS. In the first embodiment, the UPSF or the HSS pre-stores a user profile indicating whether the authentication mechanism of the user is IMS authentication bundled with NASS.

Figure 1:
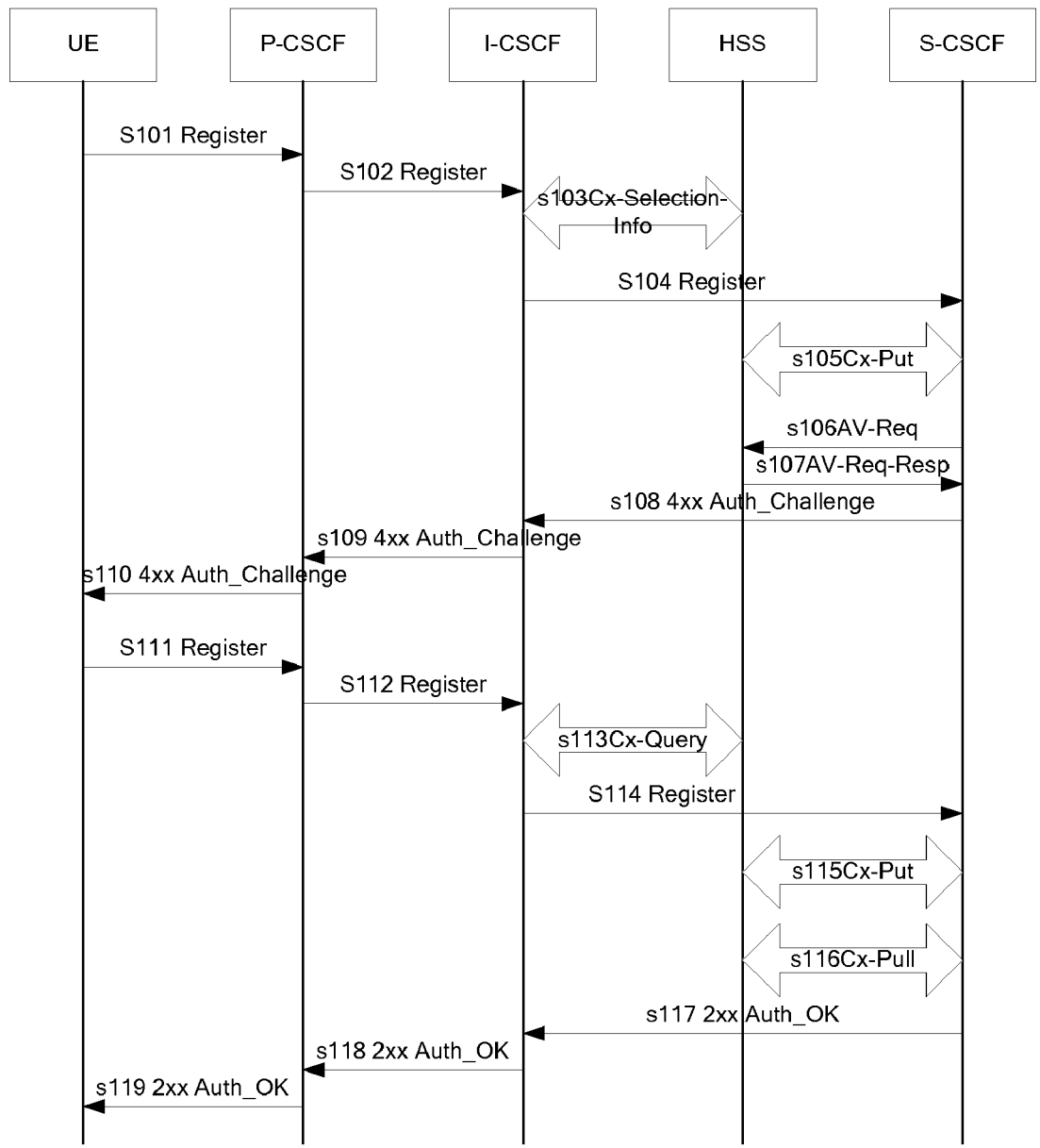
FIG. 1 is a message flow illustrating an IMS AKA scheme according to the related art.
Figure 2:
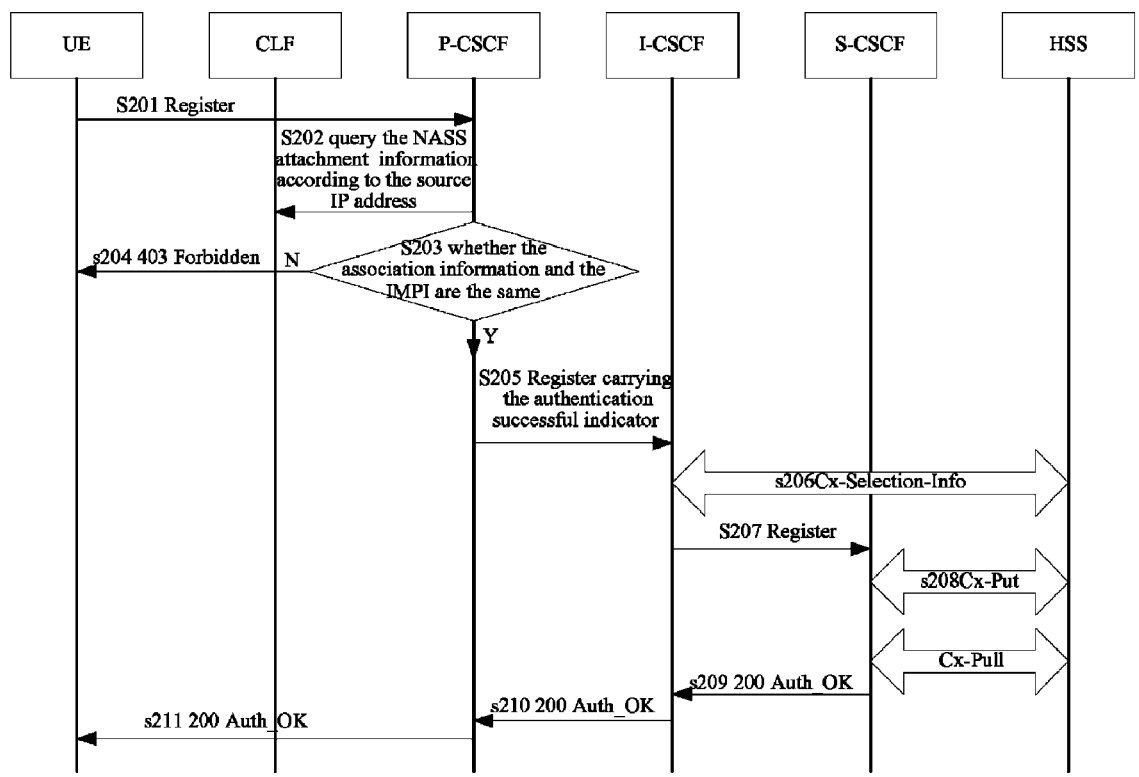
FIG. 2 is a message flow illustrating the NBA scheme according to the related art.
Figure 3A:
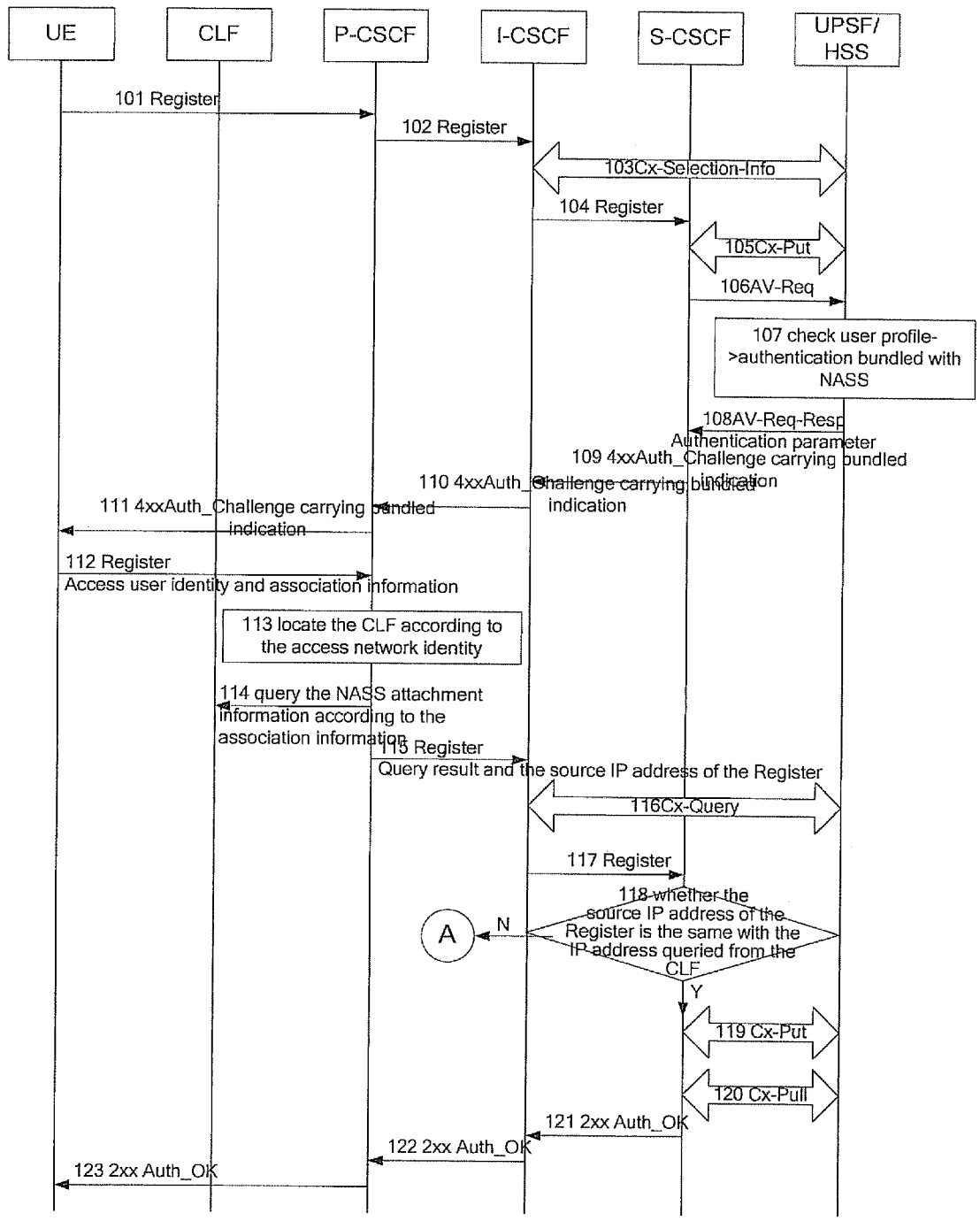
FIGS. 3a and 3b are message flows of an authentication according to a first embodiment the present invention.
Figure 3B:
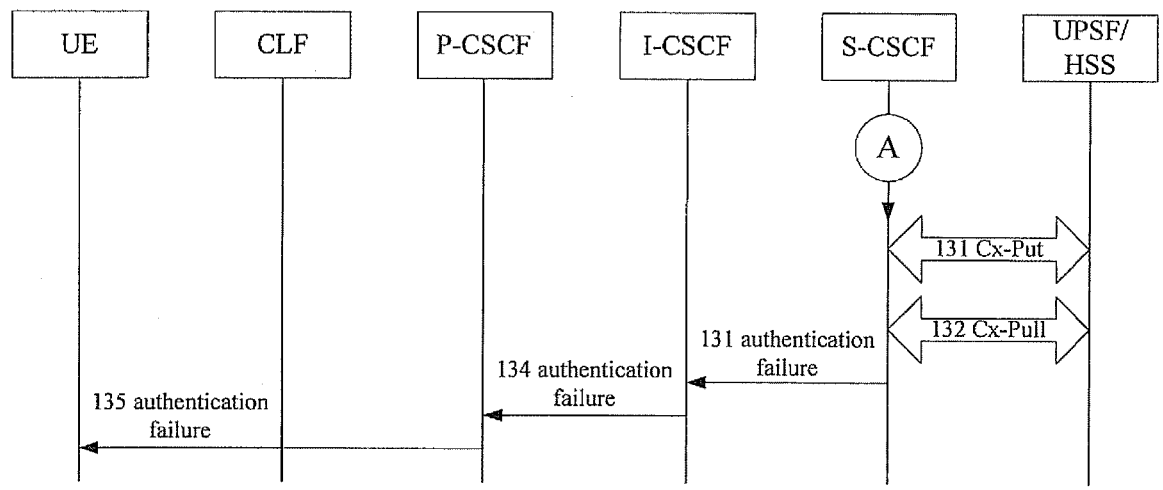

Referring to FIGS. 3a and 3b, the method of the first embodiment includes:

Block 101: The UE sends a Register message to the P-CSCF.

Block 102: The P-CSCF forwards the Register message of the UE to the I-CSCF.

Block 103: The I-CSCF interacts with the UPSF or the HSS through a Cx-Selection-Info message to select a corresponding S-CSCF, i.e., the I-CSCF sends a request to the UPSF or the HSS to select the S-CSCF for processing the Register message by analyzing the user profile in the UPSF or the HSS.

Block 104: The I-CSCF forwards the Register message of the UE to the S-CSCF selected in the Block 103.

Block 105: The S-CSCF sends a Cx-Put message to the HSS to update the S-CSCF indication information in the UPSF or the HSS and notify the UPSF or the HSS that it has been assigned to serve this user.

Block 106: The S-CSCF sends an AV-Req message to the UPSF or the HSS requesting authentication data of the user.

Block 107: The UPSF or the HSS checks the user profile to get the authentication mechanism which indicates the IMS authentication is bundled with NASS.

Block 108: The UPSF or the HSS returns an AV-Req-Resp message to the S-CSCF. Different from the authentication data sent in the related art, an indication of the authentication mechanism is sent together with the authentication data to the S-CSCF.

Block 109: The S-CSCF determines that the authentication mechanism of the user is the IMS authentication bundled with NASS according to the indication of the authentication mechanism, and then sends to the I-CSCF a 4xx Auth_Challenge message carrying the indication of the authentication mechanism, i.e., an bundled indication, in the authentication header of the 4xx Auth_Challenge message (e.g. WWW-Authenticate) to indicate that the authentication mechanism of the user is the IMS authentication bundled with NASS.

Block 110: The I-CSCF forwards the 4xx Auth_Challenge message carrying the bundled indication to the P-CSCF.

Block 111: After receiving the 4xx Auth_Challenge message, the P-CSCF determines that an "algorithm" parameter in a WWW-Authenticate header of the 4xx Auth_Challenge message indicates that the authentication mechanism of the user is the IMS authentication bundled with NASS. Therefore, the P-CSCF needs not establish a security association with the UE. The P-CSCF forwards the 4xx Auth_Challenge message carrying the bundled indication but no Security-Server header to the UE.

Block 112: After receiving the 4xx Auth_Challenge message, the UE determines that the "algorithm" parameter in the WWW-Authenticate header of the 4xx Auth_Challenge message indicates that the authentication mechanism of the user is the IMS authentication bundled with NASS. Therefore, the UE needs not establish the security association with the P-CSCF. The UE sends to the P-CSCF another Register message carrying an access network identity and association information of the UE in the access network.

Block 113: The P-CSCF locates the CLF according to the access network identity in the Register message and the preset corresponding relationship between the CLF and the access network identity.

Block 114: The P-CSCF queries the CLF located in block 113 about the NASS attachment information of the UE in the access layer according to the association information in the Register message. Different from that of the related art, the CLF pre-stores data record of the NASS attachment information corresponding to the association information, wherein the NASS attachment information includes IP address information, location information, etc., but no bundled indication. If there is no data record of the NASS attachment information corresponding to the association information, the CLF returns a query failure message to the P-CSCF.

Block 115: The P-CSCF sends the Register message carrying the query result of block 114 and the source IP address of the Register message received by the P-CSCF to the I-CSCF; if the query in block 114 succeeds, the P-CSCF sends the NASS attachment information queried to the I-CSCF; otherwise, the P-CSCF reports a query failure message to the I-CSCF.

Block 116: The I-CSCF sends a Cx-Query message to the UPSF or the HSS to determine the S-CSCF for processing the Register message, i.e., the I-CSCF queries the UPSF or the HSS about the S-CSCF which has been assigned to serve this user. The UPSF or the HSS returns the S-CSCF name which was previously selected in block 103 to the I-CSCF according to the S-CSCF indication information stored in the HSS.

Block 117: The I-CSCF forwards the Register message carrying the query result and the source IP address of the Register message received by the P-CSCF to the S-CSCF determined in the Block 116. If the query succeeds, the query result is the NASS attachment information; otherwise, the query result is the query failure message reported.

Block 118: If the query result is the NASS attachment information, the S-CSCF compares the source IP address of the Register message received by the P-CSCF with the IP address in the NASS attachment information queried from the CLF. If the source IP address of the Register message received by the P-CSCF is consistent with the IP address in the NASS attachment information queried from the CLF, it means that the authentication succeeds, proceed to Block 119, i.e., send an authentication success message to the UE; otherwise, it means that the authentication is failed, proceed to Block 131, i.e., send an authentication failure message to the UE.

If the query result is the query failure message reported, it also means that the authentication is failed, proceed to Block 131, i.e., send the authentication failure message to the UE.

Block 119: The S-CSCF sends a Cx-Put message to the UPSF or the HSS to update the S-CSCF indication information in the UPSF or the HSS and notify the UPSF or the HSS that it has been assigned to serve this user.

Block 120: The S-CSCF downloads the user profile from the UPSF or the HSS through a Cx-Pull message.

Block 121: The S-CSCF sends a 2xx Auth_OK message to the I-CSCF indicating that the authentication succeeds.

Block 122: The I-CSCF forwards the 2xx Auth_OK message to the P-CSCF.

Block 123: The P-CSCF forwards the 2xx Auth_OK message to the UE.

Block 131, as shown in FIG. 3b: The S-CSCF sends a Cx-Put message to the UPSF or the HSS to update the S-CSCF indication information in the UPSF or the HSS and notify the UPSF or the HSS that it has been assigned to serve this user.

Block 132: The S-CSCF downloads the user profile from the UPSF or the HSS through a Cx-Pull message.

Block 133: The S-CSCF sends an authentication failure message to the I-CSCF to indicate that the authentication is failed.

Block 134: The I-CSCF forwards the authentication failure message to the P-CSCF.

Block 135: The P-CSCF forwards the authentication failure message to the UE.

Figure 4A:
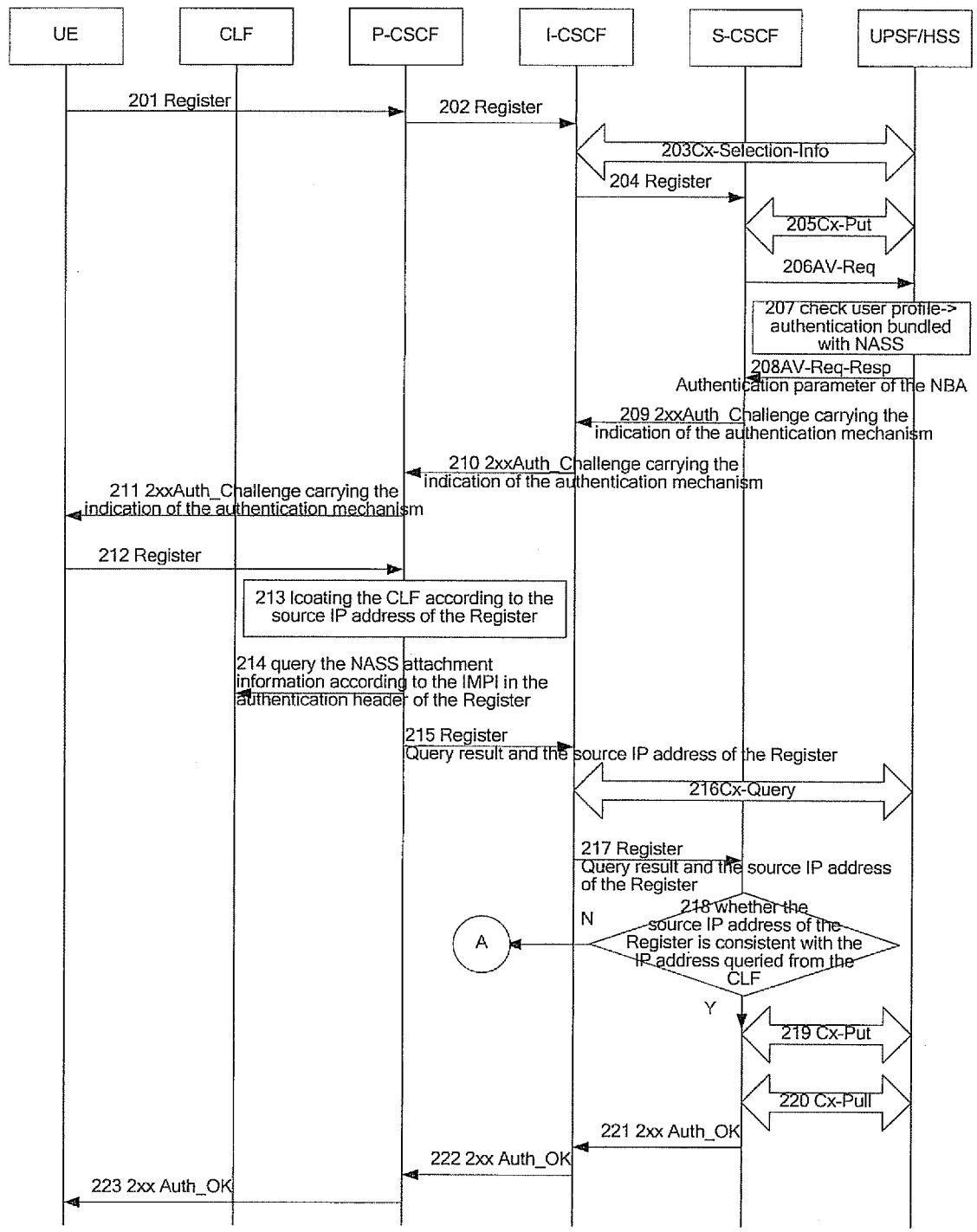
FIGS. 4a and 4b are message flows of an authentication according to a second embodiment the present invention.
Figure 4B:
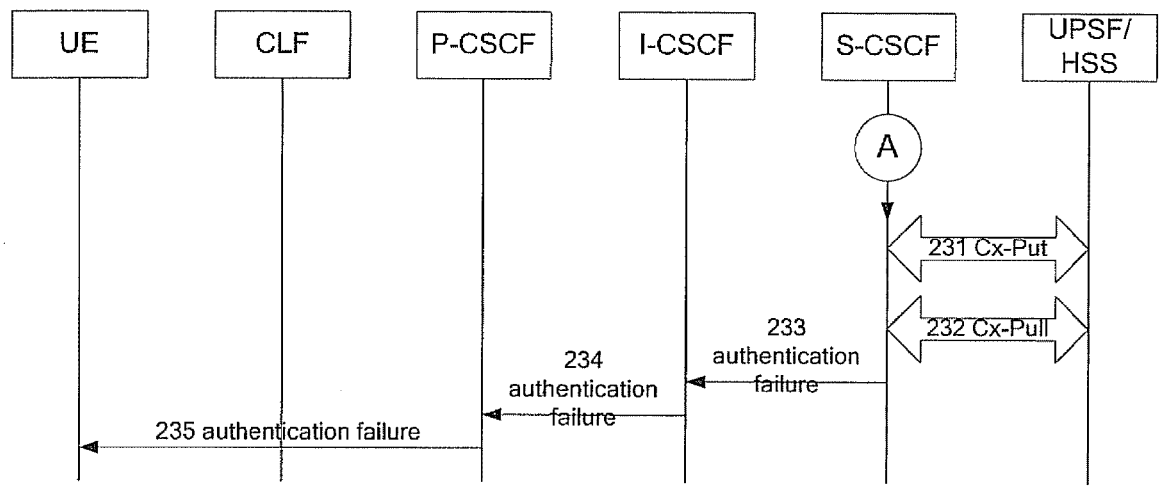

When the access network operator is the same with the service network operator, since the association information and the IMPI are the same, the NASS does not issue the access network identity and the association information to the UE. At this time, a second embodiment may be adopted, as shown in FIGS. 4a and 4b. The second embodiment is a simplification of the first embodiment. In the second embodiment, the source IP address of the Register message may be used to locate the CLF, and the IMPI in the IMS service layer may be used to query the NASS attachment information of the UE in the access layer. Similar to the first embodiment, the UPSF or the HSS also pre-stores the user profile indicating whether the authentication mechanism of the user is IMS authentication bundled with NASS.

Referring to FIGS. 4a and 4b, the method of the authentication according to the second embodiment of the present invention includes:

Blocks 201 to 211 are respectively the same as the Blocks 101 to 111 in the first embodiment.

Block 201: The UE sends a Register message to the P-CSCF.

Block 202: The P-CSCF forwards the Register message of the UE to the I-CSCF.

Block 203: The I-CSCF interacts with the UPSF or the HSS through a Cx-Selection-Info message to select a corresponding S-CSCF, i.e., the I-CSCF sends a request to the UPSF or the HSS to search the user profile in the UPSF or the HSS to select which S-CSCF will process the Register message.

Block 204: The I-CSCF forwards the Register message of the UE to the S-CSCF selected in the Block 203.

Block 205: The S-CSCF sends a Cx-Put message to the UPSF or the HSS to update the S-CSCF indication information in the UPSF or the HSS and notify the UPSF or the HSS that it has been assigned to serve this user.

Block 206: The S-CSCF sends an AV-Req message to the UPSF or the HSS requesting the authentication data of the user.

Block 207: The UPSF or the HSS checks the user profile to get the authentication mechanism which indicates the IMS authentication is bundled with NASS.

Block 208: The UPSF or the HSS returns an AV-Req-Resp message to the S-CSCF. Different from the authentication data sent in the related art, the indication of the authentication mechanism is sent together with the authentication data to the S-CSCF.

Block 209: The S-CSCF determines that the authentication mechanism of the user is the IMS authentication bundled with NASS according to the indication of the authentication mechanism obtained in the Block 208, and then sends to the I-CSCF a 4xx Auth_Challenge message carrying the indication of the authentication mechanism, i.e., the bundled indication, in the authentication header of the 4xx Auth_Challenge message to indicate that the authentication mechanism of the user is the IMS authentication bundled with NASS.

Block 210: The I-CSCF forwards the 4xx Auth_Challenge message carrying the bundled indication to the P-CSCF.

Block 211: After receiving the 4xx Auth_Challenge message, the P-CSCF determines that the "algorithm" parameter in the WWW-Authenticate header of the 4xx Auth_Challenge message indicates that the authentication mechanism of the user is IMS authentication bundled with NASS. Therefore, the P-CSCF needs not establish a security association with the UE. The P-CSCF forwards the 4xx Auth_Challenge message carrying the bundled indication but no Security-Server header to the UE.

Block 212: After receiving the 4xx Auth_Challenge message, the UE determines that the "algorithm" parameter in the WWW-Authenticate header of the 4xx Auth_Challenge indicates that the authentication mechanism of the user is IMS authentication bundled with NASS. Therefore, the UE needs not establish the security association with the P-CSCF. The UE sends a Register message to the P-CSCF again. Different from that in the first embodiment, the Register message needs not carry the access network identity and the association information, instead, the Register message carries the IMPI in the authentication header.

Block 213: The P-CSCF locates the CLF according to the source IP address of the Register message and the pre-set corresponding relationship between the source IP address and the CLF.

Block 214: The P-CSCF queries the CLF about the NASS attachment information of the UE in the access layer according to the IMPI carried in the authentication header of the Register message. The CLF pre-stores the data record of the NASS attachment information corresponding to the IMPI. The NASS attachment information includes IP address information, location information, etc., but no bundled indication in the related alt. If the CLF has no data record corresponding to the IMPI, the CLF returns a query failure message to the P-CSCF.

Blocks 215 to 223 are respectively the same as the Blocks 115 to 123 in the first embodiment.

Block 215: The P-CSCF sends the Register message to the I-CSCF with the query result of block 214 and the source IP address of the Register message received by the P-CSCF; if the query in block 214 succeeds, the P-CSCF sends the NASS attachment information queried to the I-CSCF; otherwise, the P-CSCF reports a query failure message to the I-CSCF.

Block 216: The I-CSCF sends a Cx-Query message to the UPSF or the HSS to determine the S-CSCF for processing the Register message, i.e., the I-CSCF queries the UPSF or the HSS about the S-CSCF which has been assigned to serve this user. The UPSF or the HSS returns the S-CSCF name which was previously selected in block 203 to the I-CSCF according to the S-CSCF indication information stored in the HSS.

Block 217: The I-CSCF forwards the Register message carrying the query result and the source IP address of the Register message received by the P-CSCF to the S-CSCF determined in the Block 216. If the query succeeds, the query result is the NASS attachment information obtained; otherwise, the query result is the query failure message reported.

Block 218: If the query result is the NASS attachment information queried, the S-CSCF compares the source IP address of the Register message received by the P-CSCF with the IP address in the NASS attachment information queried from the CLF. If the source IP address of the Register message received by the P-CSCF is consistent with the IP address in the NASS attachment information queried from the CLF, it means that the authentication succeeds, proceed to Block 219, i.e., send an authentication success message to the UE; otherwise, it means that the authentication is failed, proceed to Block 231, i.e., send an authentication failure message to the UE.

If the query result is the query failure message reported, it also means that the authentication is failed, proceed to Block 231, i.e., send the authentication failure message to the UE.

Block 219: The S-CSCF sends a Cx-Put message to the UPSF or the HSS to update the S-CSCF indication information in the UPSF or the HSS and notify the UPSF or the HSS that it has been assigned to serve this user.

Block 220: The S-CSCF downloads the user profile from the UPSF or the HSS through a Cx-Pull message.

Block 221: The S-CSCF sends a 2xx Auth_OK message to the I-CSCF indicating that the authentication succeeds.

Block 222: The I-CSCF forwards the 2xx Auth_OK message to the P-CSCF.

Block 223: The P-CSCF forwards the 2xx Auth_OK message to the UE.

Block 231, as shown in FIG. 4b: The S-CSCF sends a Cx-Put message to the UPSF or the HSS to update the S-CSCF indication information in the UPSF or the HSS and notify the UPSF or the HSS that it has been assigned to serve this user.

Block 232: The S-CSCF downloads the user profile from the UPSF or the HSS through a Cx-Pull message.

Block 233: The S-CSCF sends an authentication failure message to the I-CSCF indicating that the authentication is failed.

Block 234: The I-CSCF forwards the authentication failure message to the P-CSCF.

Block 235: The P-CSCF forwards the authentication failure message to the UE.

In the methods in accordance with the first and the second embodiments, the UE will not send the Register message carrying the access network identity and the association information until determining that the authentication mechanism is IMS authentication bundled with NASS. While in the third embodiment, the UE sends the Register message carrying the access network identity and the association information at the very start. Similar to the first and the second embodiments, the UPSF or the HSS pre-stores the user profile indicating whether the authentication mechanism of the user is IMS authentication bundled with NASS.

Figure 5A:
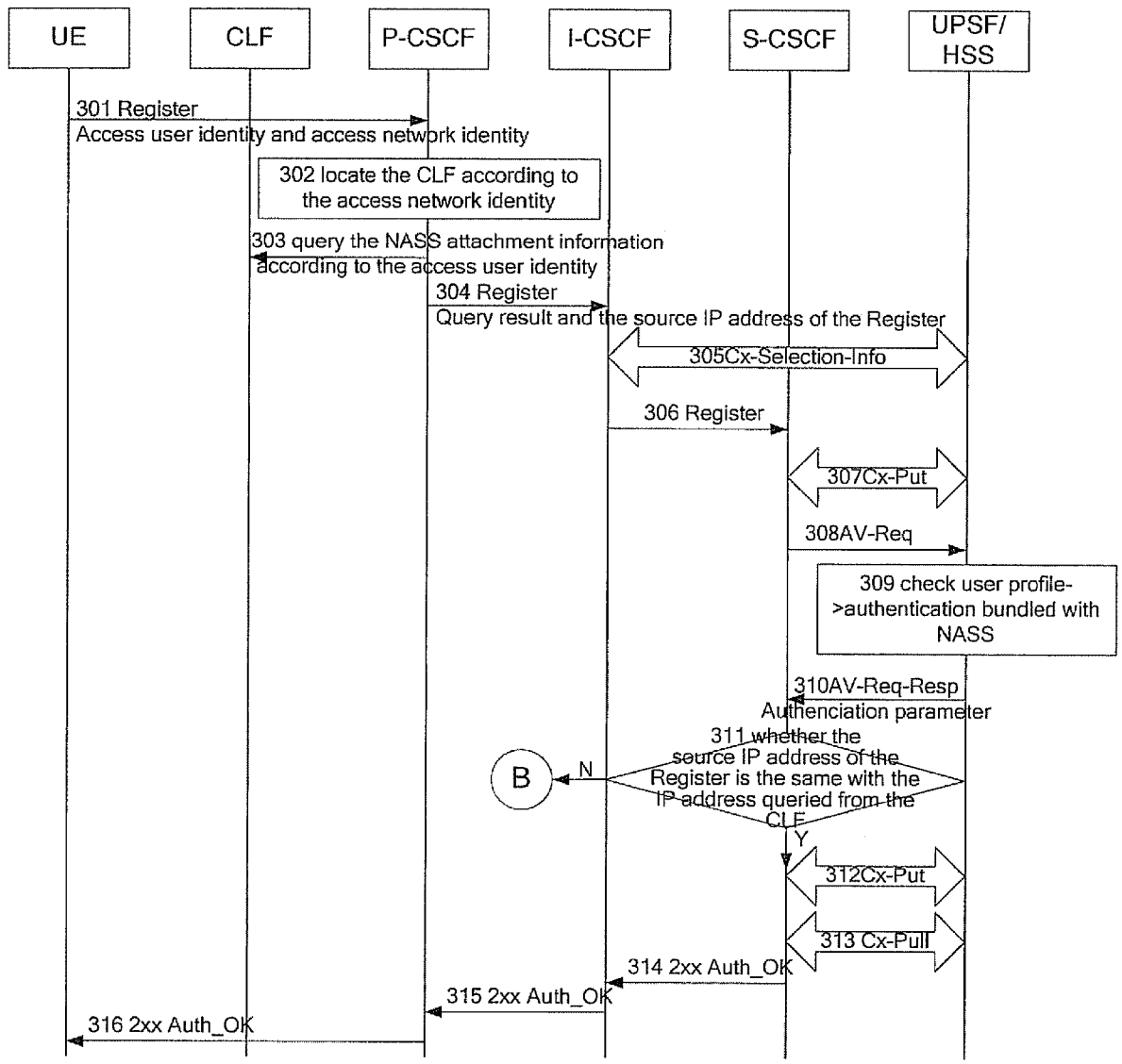
FIGS. 5a and 5b are message flows of an authentication according to a third embodiment the present invention.
Figure 5B:
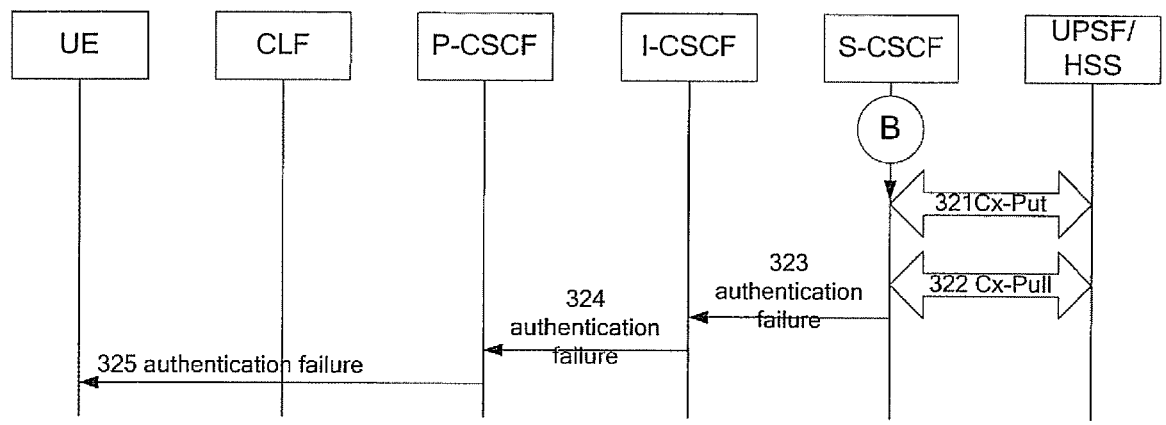

Referring to FIGS. 5a and 5b, the method of authentication according to the third embodiment is as follows:

Block 301: The UE sends a Register message carrying the access network identity and the association information to the P-CSCF.

Block 302: The P-CSCF locates the CLF according to the access network identity in the Register message and the preset corresponding relationship between the CLF and the access network identity.

Block 303: The P-CSCF queries the CLF located in block 302 about the NASS attachment information of the UE in the access layer according to the association information in the Register message. The CLF pre-stores the data record of the NASS attachment information corresponding to the association information, wherein the NASS attachment information includes IP address information, location information, etc., but no bundled indication in the related art. If there is no data record of the NASS attachment information corresponding to the association information, the CLF returns a query failure message to the P-CSCF.

Block 304: The P-CSCF sends to the I-CSCF the Register message carrying the query result in block 303 and the source IP address of the Register message received by the P-CSCF; if the query in block 303 succeeds, the P-CSCF sends the NASS attachment information queried to the I-CSCF; otherwise, the P-CSCF reports a query failure message to the I-CSCF.

Block 305: The I-CSCF interacts with the UPSF or the HSS through a Cx-Selection-Info message to select a corresponding S-CSCF, i.e., the I-CSCF sends a request to the UPSF or the HSS to search the user profile in the UPSF or the HSS to select the S-CSCF for processing the Register message.

Block 306: The I-CSCF forwards the Register message carrying the query result and the source IP address of the Register message received by the P-CSCF to the S-CSCF selected in the Block 305. If the query succeeds, the query result is the NASS attachment information queried; otherwise, the query result is the query failure message reported.

Block 307: The S-CSCF sends a Cx-Put message to the HSS to update the S-CSCF indication information in the UPSF or the HSS and notify the UPSF or the HSS that it has been assigned to serve this user.

Block 308: The S-CSCF sends an AV-Req message to the UPSF or the HSS requesting the authentication data of the user.

Block 309: The UPSF or the HSS checks the user profile and determines that the authentication mechanism of the user is the IMS authentication bundled with NASS.

Block 310: The UPSF or the HSS returns an AV-Req-Resp message to the S-CSCF. Different from the authentication data sent in the related art, an indication of the authentication mechanism is sent together with the authentication data to the S-CSCF.

Block 311: if the query result is the NASS attachment information queried, the S-CSCF compares the source IP address of the Register message received by the P-CSCF with the IP address in the NASS attachment information queried from the CLF. If the source IP address of the Register message received by the P-CSCF is consistent with the IP address in the NASS attachment information queried from the CLF, it means that the authentication succeeds, proceed to Block 312, i.e., send an authentication success message to the UE; otherwise, it means that the authentication is failed, proceed to Block 321, i.e., send an authentication failure message to the UE.

If the query result is the query failure message reported, it also means that the authentication is failed, proceed to Block 321, i.e., send the authentication failure message to the UE.

Block 312: The S-CSCF sends a Cx-Put message to the UPSF or the HSS to update the S-CSCF indication information in the UPSF or the HSS and notify the UPSF or the HSS that it has been assigned to serve this user.

Block 313: The S-CSCF downloads the user profile from the UPSF or the HSS through a Cx-Pull message.

Block 314: The S-CSCF sends a 2xx Auth_OK message to the I-CSCF indicating that the authentication succeeds.

Block 315: The I-CSCF forwards the 2xx Auth_OK message to the P-CSCF.

Block 316: after receiving the 2xx Auth_OK message, the P-CSCF determines that it did not receive a 4xx Auth_Challenge message before, therefore the P-CSCF needs not establish a security association with the UE The P-CSCF forwards the 2xx Auth_OK message to the UE; and after receiving the 2xx Auth_OK message, the UE determines that it did not receive the 4xx Auth_Challenge message before, therefore the UE needs not establish the security association with the P-CSCF.

Block 321, as shown in FIG. 5b: The S-CSCF sends a Cx-Put message to the UPSF or the HSS to update the S-CSCF indication information in the UPSF or the HSS and notify the UPSF or the HSS that it has been assigned to serve this user.

Block 322: The S-CSCF downloads the user profile from the UPSF or the HSS through a Cx-Pull message.

Block 323: The S-CSCF sends an authentication failure message to the I-CSCF indicating that the authentication is failed.

Block 324: The I-CSCF forwards the authentication failure message to the P-CSCF.

Block 325: The P-CSCF forwards the authentication failure message to the UE.

Figure 6A:
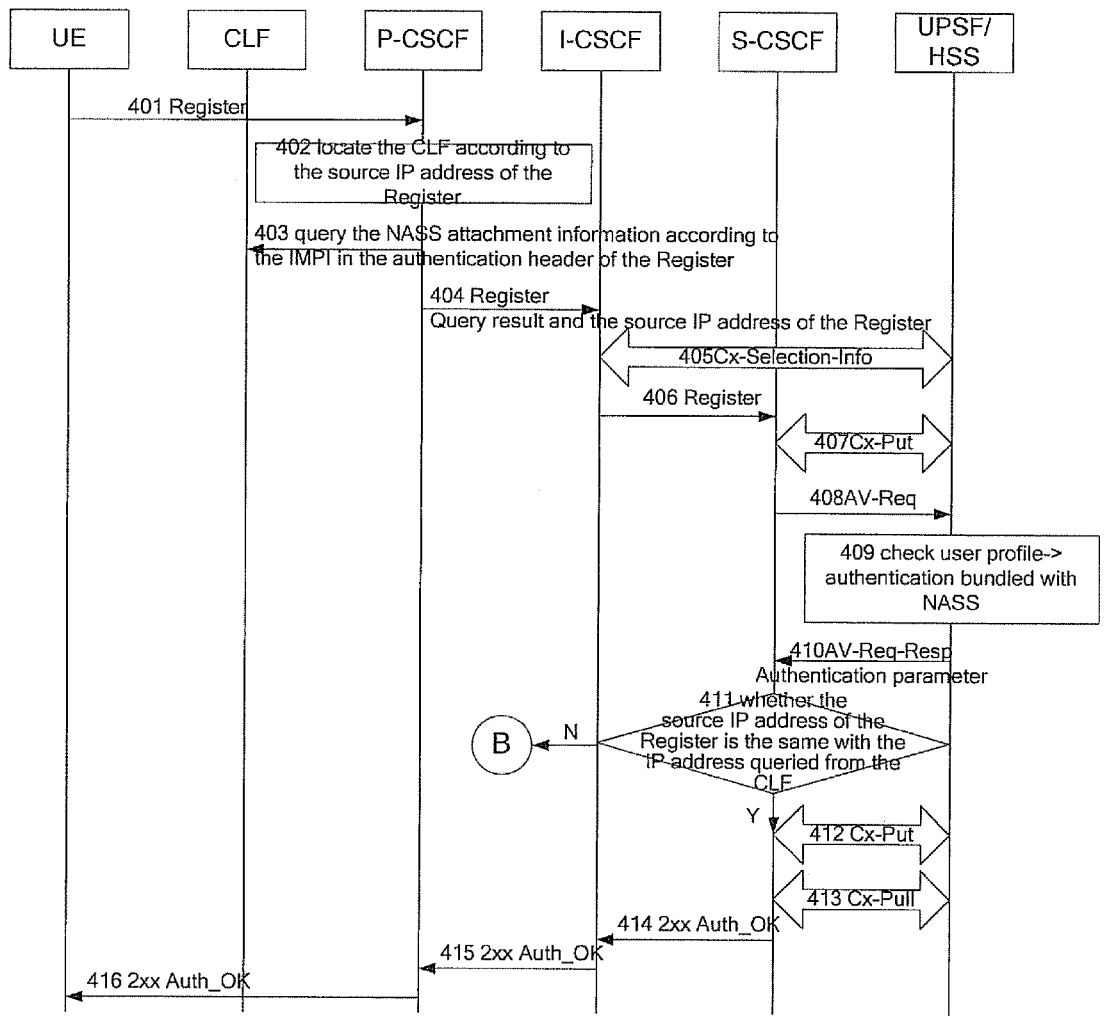
FIGS. 6a and 6b are message flows of an authentication according to a fourth embodiment the present invention.
Figure 6B:
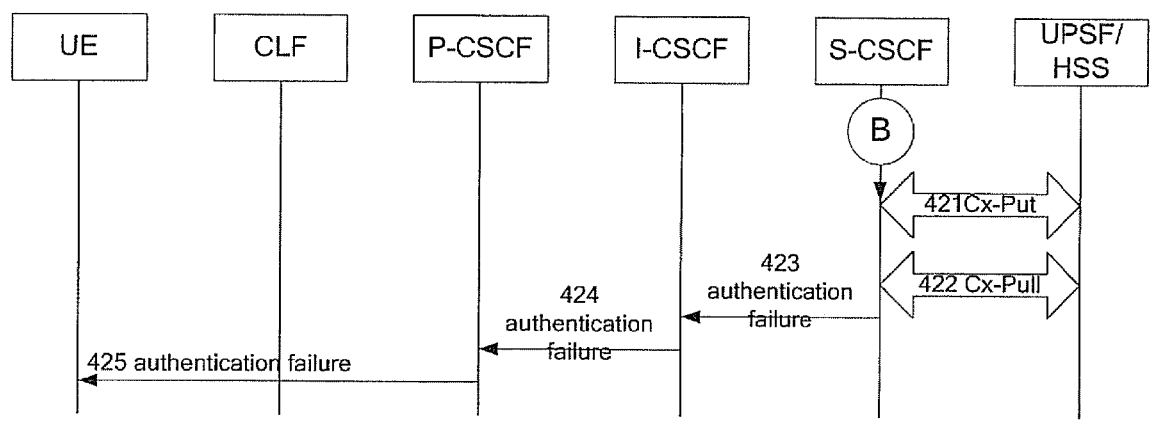

Similar to the second embodiment, when the access network operator is the same with the service network operator, since the association information and the IMPI are the same, the NASS does not issue the access network identity and the association information to the UE. At this time, a fourth embodiment may be adopted, as shown in FIGS. 6a and 6b. The fourth embodiment is a simplification of the third embodiment. In the fourth embodiment, the access network operator and the CLF are recognized through the source IP address of the Register message, and the NASS attachment information of the UE in the access layer is queried from the CLF according to the IMPI in the IMS service layer. Similar to the first embodiment, the UPSF or the HSS also pre-stores the user profile indicating whether the authentication mechanism of the user is IMS authentication bundled with NASS.

Referring to FIGS. 6a and 6b, the method of the fourth embodiment includes:

Block 401: The UE sends a Register message to the P-CSCF. Different from the third embodiment, the Register message needs not carry the access network identity and the association information. Instead, the Register message carries the IMPI in the authentication header.

Block 402: The P-CSCF locates the CLF according to the source IP address of the Register message and the pre-set corresponding relationship between the source IP address and the CLF Block 403: The P-CSCF queries the CLF about the NASS attachment information of the UE in the access layer according to the IMPI carried in the authentication header of the Register message. The CLF pre-stores the data record of the NASS attachment information corresponding to the IMPI. The NASS attachment information includes IP address information, location information, etc., but no bundled indication in the related art. If the CLF has no data record corresponding to the IMPI, the CLF returns a query failure message to the P-CSCF.

Blocks 404 to 425 are respectively the same as the Blocks 304 to 325 in the third embodiment.

Block 404: The P-CSCF sends to the I-CSCF the Register message carrying the query result in block 403 and the source IP address of the Register message received by the P-CSCF; if the query in block 403 succeeds, the P-CSCF sends the NASS attachment information queried to the I-CSCF; otherwise, the P-CSCF reports a query failure message to the I-CSCF.

Block 405: The I-CSCF interacts with the UPSF or the HSS through a Cx-Selection-Info message to select a corresponding S-CSCF, i.e., the I-CSCF sends a request to the UPSF or the HSS to search the user profile in the UPSF or the HSS to select the S-CSCF for processing the Register message.

Block 406: The I-CSCF forwards the Register message carrying the query result and the source IP address of the Register message received by the P-CSCF to the S-CSCF selected in the Block 405. If the query succeeds, the query result is the NASS attachment information queried; otherwise, the query result is the query failure message reported.

Block 407: The S-CSCF sends a Cx-Put message to the UPSF or the HSS to update the S-CSCF indication information in the UPSF or the HSS and notify the UPSF or the HSS that it has been assigned to serve this user.

Block 408: The S-CSCF sends an AV-Req message to the UPSF or the HSS requesting the authentication data of the user.

Block 409: The UPSF or the HSS checks the user profile to get the authentication mechanism which indicates the IMS authentication is bundled with NASS.

Block 410: The UPSF or the HSS returns an AV-Req-Resp message to the S-CSCF. Different from the authentication data sent in the related art, an indication of the authentication mechanism is sent together with the authentication data to the S-CSCF.

Block 411: if the query result is the NASS attachment information queried, the S-CSCF compares the source IP address of the Register message received by the P-CSCF with the IP address in the NASS attachment information queried from the CLF. If the source IP address of the Register message received by the P-CSCF is consistent with the IP address in the NASS attachment information queried from the CLF, it means that the authentication succeeds, proceed to Block 412, i.e., send an authentication success message to the UE; otherwise, it means that the authentication is failed, proceed to Block 421, i.e., send an authentication failure message to the UE.

If the query result is the query failure message reported, it also means that the authentication is failed, proceed to Block 421, i.e., send the authentication failure message to the UE.

Block 412: The S-CSCF sends a Cx-Put message to the UPSF or the HSS to update the S-CSCF indication information in the UPSF or the HSS and notify the UPSF or the HSS that it has been assigned to serve this user.

Block 413: The S-CSCF downloads the user profile from the UPSF or the HSS through a Cx-Pull message.

Block 414: The S-CSCF sends a 2xx Auth_OK message to the I-CSCF indicating that the authentication succeeds.

Block 415: The I-CSCF forwards the 2xx Auth_OK message to the P-CSCF.

Block 416: after receiving the 2xx Auth_OK message, the P-CSCF determines that it did not receive a 4xx Auth_Challenge message before, therefore the P-CSCF needs not establish a security association with the UE The P-CSCF forwards the 2xx Auth_OK message to the UE; and after receiving the 2xx Auth_OK message, the UE determines that it did not receive the 4xx Auth_Challenge message before, therefore the UE needs not establish a security association with the P-CSCF.

Block 421, as shown in FIG. 6b: The S-CSCF sends a Cx-Put message to the UPSF or the HSS to update the S-CSCF indication information in the UPSF or the HSS and notify the UPSF or the HSS that it has been assigned to serve this user.

Block 422: The S-CSCF downloads the user profile from the UPSF or the HSS through a Cx-Pull message.

Block 423: The S-CSCF sends an authentication failure message to the I-CSCF indicating that the authentication is failed.

Block 424: The I-CSCF forwards the authentication failure message to the P-CSCF.

Block 425: The P-CSCF forwards the authentication failure message to the UE.

In the methods according to the first to the fourth embodiments, the S-CSCF authenticates the UE by comparing whether the source IP address of the Register message received by the P-CSCF is consistent with the IP address queried from the CLF. In the fifth embodiment of the present invention, the S-CSCF authenticates the UE by comparing whether the association information of the UE in the access network pre-stored in the UPSF or the HSS is consistent with that queried from the CLF. The association information may be an access user identity, location information, IP address information, etc. In the fifth embodiment, the access user identity is taken as an example. And the source IP address of the Register message is taken as an example to illustrate the process of locating the CLF and the process of querying the association information from the CLF. It can be seen from the foregoing embodiments of the present invention, the process of locating the CLF and the process of querying the association information from the CLF may be implemented employing other parameters, which will not be repeated herein.

Figure 7A:
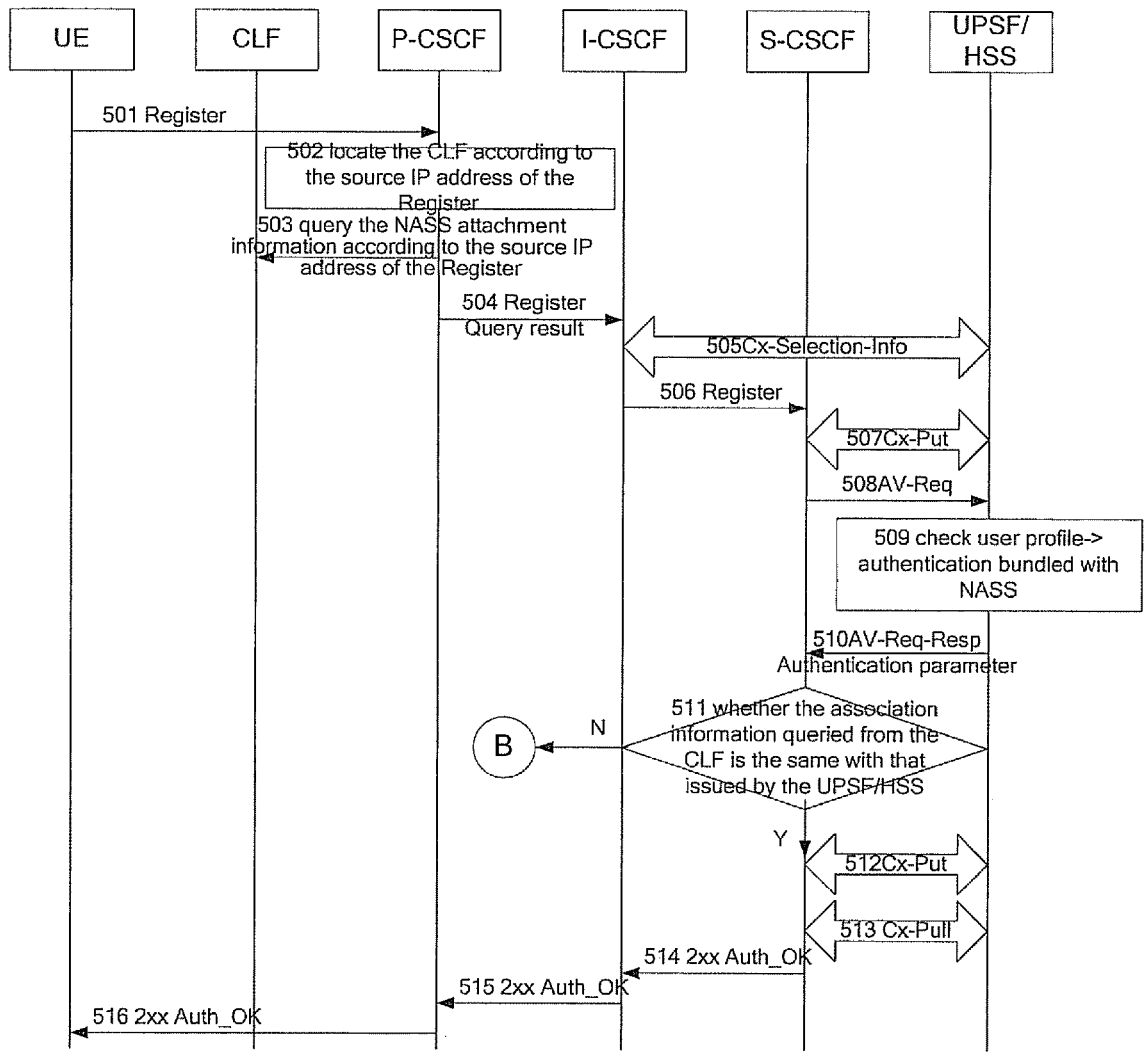
FIGS. 7a and 7b are message flows of an authentication according to a fifth embodiment the present invention.
Figure 7B:
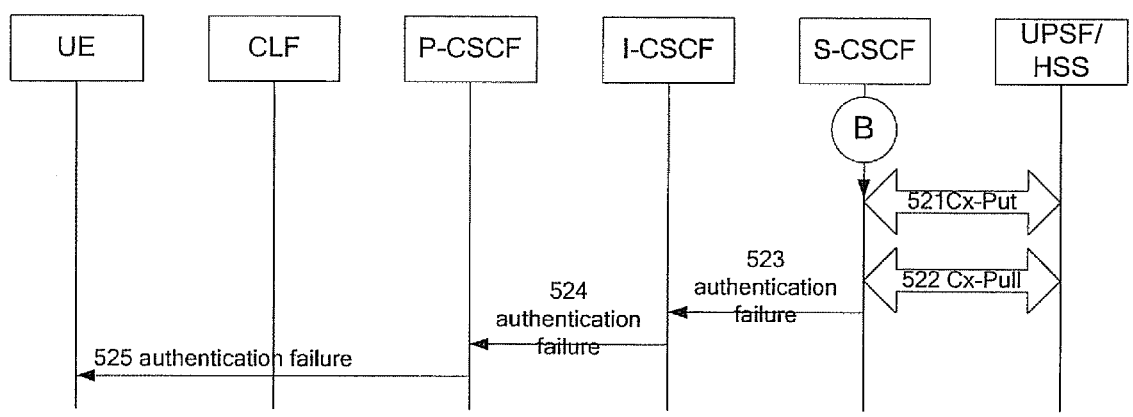

Referring to FIGS. 7a and 7b, the method of authentication in accordance with the fifth embodiment is as follows:

Block 501: The UE sends a Register message to the P-CSCF.

Block 502: The P-CSCF locates the CLF according to the source IP address of the Register message and the corresponding relationship between the CLF and the source IP address of the Register message.

Block 503: The P-CSCF queries the CLF about the access user identity of the user according to the source IP address of the Register message. The CLF pre-stores data record of the NASS attachment information of the UE corresponding to the source IP address; and the NASS attachment information includes at least the association information which is the access user identity herein. If the CLF has no data record corresponding to the source IP address, the CLF returns a query failure message.

Block 504: The P-CSCF sends the Register message carrying the query result of block 503 to the I-CSCF. If the querying succeeds, the P-CSCF takes the access user identity as the query result to send to the I-CSCF; if the querying is failed, the P-CSCF reports a query failure message to the I-CSCF as the query result.

Block 505: The I-CSCF selects a corresponding S-CSCF by interacting with the UPSF or the HSS through a Cx-Selection-Info message, i.e., the I-CSCF sends a request to the UPSF or the HSS to search a user profile of the UE in the UPSF or the HSS to select the S-CSCF for processing the Register message.

Block 506: The I-CSCF forwards the Register message including the query result to the S-CSCF selected in the Block 505. If the querying succeeds, the query result is the access user identity, if the querying is failed, the query result is the query failure message reported.

Block 507: The S-CSCF sends a Cx-Put message to the UPSF or the HSS to update the S-CSCF indication information in the UPSF or the HSS and notify the UPSF or the HSS that it has been assigned to serve this user.

Block 508: The S-CSCF sends an AV-Req message to the UPSF or the HSS requesting the authentication data of the user.

Block 509: The UPSF or the HSS checks the user profile to get the authentication mechanism which indicates the IMS authentication is bundled with NASS.

Block 510: The UPSF or the HSS sends an AV-Req-Resp message to the S-CSCF. Different from the authentication data sent in the related art, the authentication mechanism information of the user and the access user identity are issued to the S-CSCF in this block.

Block 511: if the query result is the access user identity, the S-CSCF determines whether the access user identity queried from the CLF is consistent with the access user identity issued by the UPSF or the HSS. If the access user identity queried from the CLF is consistent with the access user identity issued by the UPSF or the HSS, it means that the authentication succeeds, proceed to Block 512, i.e., send an authentication success message to the UE; if the access user identity queried from the CLF is not consistent with the access user identity issued by the UPSF or the HSS, it means that the authentication is failed, proceed to Block 521, i.e., send an authentication failure message to the UE.

If the above query result is the query failure message reported, it also means that the authentication is failed, proceed to Block 521, i.e., send the authentication failure message to the UE.

Block 512: The S-CSCF sends a Cx-Put message to the UPSF or the HSS to update the S-CSCF indication information in the UPSF or the HSS and notify the UPSF or the HSS that it has been assigned to serve this user.

Block 513: The S-CSCF queries the user profile from the UPSF or the HSS through a Cx-Pull message.

Block 514: The S-CSCF sends a 2xx Auth_OK message to the I-CSCF indicating that the authentication succeeds;

Block 515: The I-CSCF forwards the 2xx Auth_OK message to the P-CSCF.

Block 516: after receiving the 2xx Auth_OK message, the P-CSCF determines that it does not receive a 4xx Auth_Challenge message before; therefore, the P-CSCF needs not establish the security association with the UE. The P-CSCF forwards the 2xx Auth_OK message to the UE. After receiving the 2xx Auth_OK message, the UE determines that it does not receive a 4xx Auth_Challenge before; therefore it needs not establish the security association with the P-CSCF.

Block 521, as shown in FIG. 7b: The S-CSCF sends a Cx-Put message to the UPSF or the HSS to update the S-CSCF indication information in the UPSF or the HSS and notify the UPSF or the HSS that it has been assigned to serve this user.

Block 522: The S-CSCF downloads the user profile from the UPSF or the HSS through a Cx-Pull message.

Block 523: The S-CSCF sends an authentication failure message to the I-CSCF indicating that the authentication is failed.

Block 524: The I-CSCF forwards the authentication failure message to the P-CSCF.

Block 525: The P-CSCF forwards the authentication failure message to the UE.

In the above embodiments, the UPSF or the HSS stores only one authentication mechanism for one user, i.e., the IMS authentication bundled with NASS. In the above embodiments, the user will be rejected to access to the network if the IMS authentication bundled with NASS is failed, which restricts the authentication and use of network services when the user is roaming. The roaming means that the user may change his/her access point when moving, but the ongoing session is completely interrupted and needs to be restarted.

For example, the user may desire to use a traditional terminal to access to the network at a fixed location, at this time, the IMS authentication bundled with NASS is adopted. When roaming to another place, the user may desire to use another terminal to access to the network. Since the location information of the user is changed, if still using the IMS authentication bundled with NASS to authenticate the user, the authentication will fail, which affects the user from using the network. Therefore, a Hyper Text Transmission Protocol Digest (HTTP DIGEST) authentication mechanism or the IMS AKA authentication mechanism may be adopted after the IMS authentication bundled with NASS mechanism fails, thereby providing a flexible authentication for the user.

Figure 8:
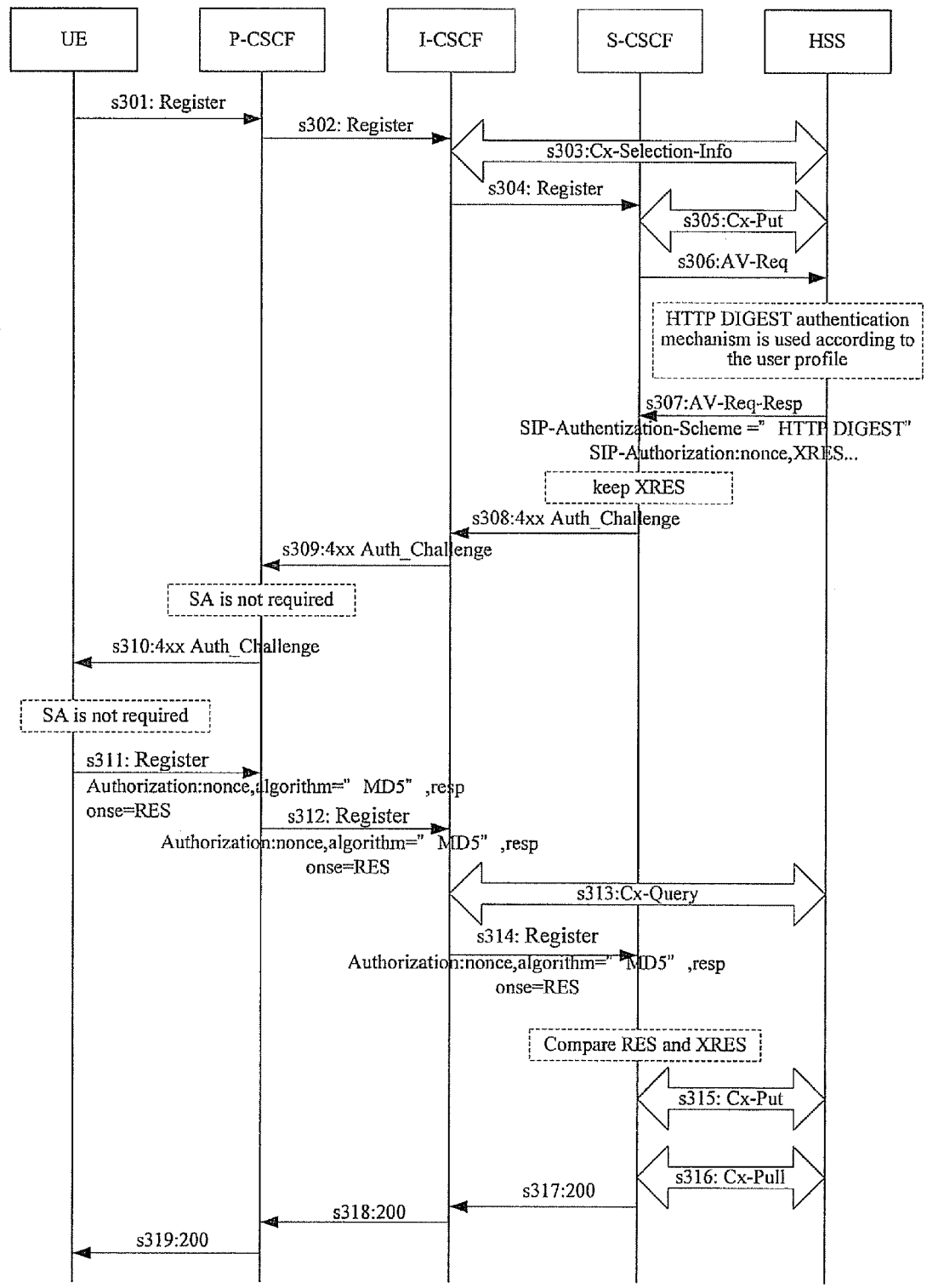
FIG. 8 is a message flow illustrating an HTTP DIGEST authentication.

Referring to FIG. 8, the process of the HTTP DIGEST authentication mechanism mainly includes:

Block s301: The UE sends a Register message to the P-CSCF.

Block s302: The P-CSCF forwards the Register message of the UE to the I-CSCF.

Block s303: The I-CSCF selects a corresponding S-CSCF by interacting with the HSS through a Cx-Selection-Info message, i.e., the I-CSCF sends a request to the HSS to search the user profile in the HSS to select the S-CSCF for processing the Register message.

Block s304: The I-CSCF forwards the Register message of the UE to the S-CSCF selected in the Block s303.

Block s305: The S-CSCF sends a Cx-Put message to the HSS to update the S-CSCF indication information and, notify the HSS that it has been assigned to serve this user.

Block s306: The S-CSCF sends an AV-Req message to the HSS requesting the authentication data of the user.

Block s307: The HSS checks the user profile and determines that the authentication mechanism of the user is the HTTP DIGEST, and generates authentication parameters such as nonce and expectation response (XRES), etc.

The HSS sends an AV-Req-Resp message carrying an indication of the authentication mechanism, HTTP DIGEST, and the authentication parameters such as nonce, XRES to the S-CSCF.

Block s308: The S-CSCF obtains the indication of the authentication mechanism and stores the XRES, then sends a 4xx Auth_Challenge message to the I-CSCF.

Block s309: The I-CSCF forwards the 4xx Auth_Challenge message to the P-CSCF.

Block s310: after receiving the 4xx Auth_Challenge message, the P-CSCF determines that the "algorithm" parameter in the WWW-Authenticate header of the 4xx Auth_Challenge message indicates that the authentication mechanism of the user is the HTTP DIGEST; therefore the P-CSCF needs not establish a security association with the UE. The P-CSCF sends the 4xx Auth_Challenge message without the Security-Server header to the UE.

Block s311: after receiving the 4xx Auth_Challenge message, the UE determines that the "algorithm" parameter indicates that the authentication mechanism of the user is the HTTP DIGEST, therefore the UE needs not establish the security association with the P-CSCF; and the UE sends a Register message carrying a response (RES) to the P-CSCF again.

Block s312: The P-CSCF forwards the Register message carrying the RES to the I-CSCF.

Block s313: The I-CSCF sends a Cx-Query message to the HSS to determine the S-CSCF for processing the Register message, i.e., the I-CSCF queries the UPSF or the HSS about the S-CSCF which has been assigned to serve this user. The HSS returns the S-CSCF name which was previously selected in block s303 to the I-CSCF according to the S-CSCF indication information stored in the HSS.

Block s314: The I-CSCF forwards the Register message to the S-CSCF determined in the Block s313.

The S-CSCF compares the XRES obtained from the HSS with the RES sent by the UE; if the XRES obtained from the HSS is consistent with the RES sent by the UE, it means that the authentication succeeds; otherwise, it means that the authentication is failed.

Block s315: The S-CSCF sends a Cx-Put message to the HSS to update the S-CSCF indication information in the HSS and notify the HSS that it has been assigned to serve this user.

Block s316: The S-CSCF downloads the user profile from the HSS through a Cx-Pull message.

Block s317: The S-CSCF sends a 200 message indicating that the authentication succeeds to the I-CSCF, or a 403 Forbidden message indicating that the authentication is failed to the I-CSCF. For illustrative purpose, only the 200 message sent when the authentication succeeds is shown in FIG. 8.

Block s318: The I-CSCF forwards the 200 message or 403 Forbidden message to the P-CSCF.

Block s319: The P-CSCF forwards the 200 message or 403 Forbidden message to the UE.

In accordance with the first to the fifth embodiments, the authentication data pre-stored in the UPSF or the HSS is configured as the HTTP DIGEST or the IMS AKA authentication mechanism besides the IMS authentication bundled with NASS.

Figure 9A:
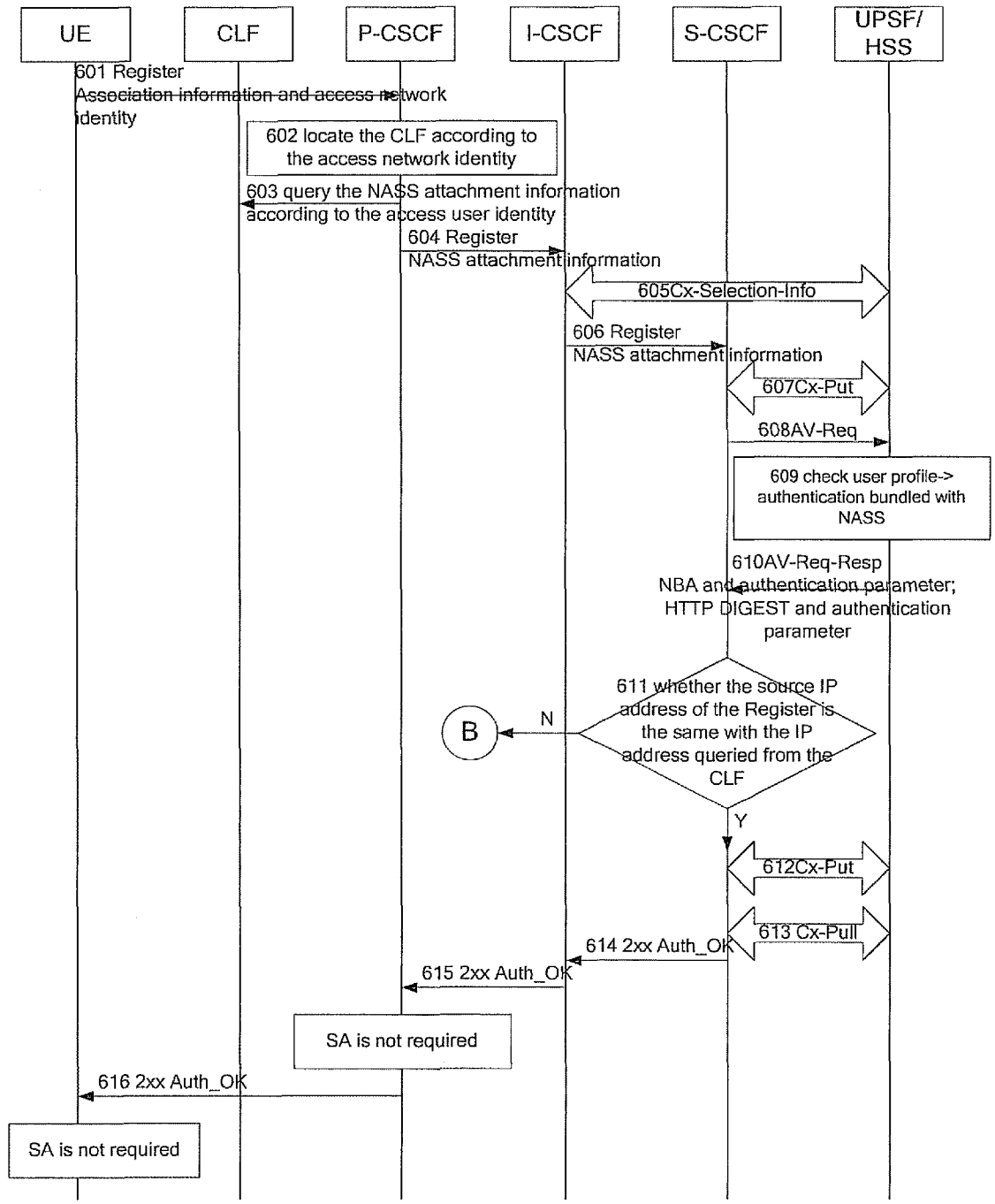
FIGS. 9a and 9b are message flows of an authentication according to a sixth embodiment the present invention.
Figure 9B:
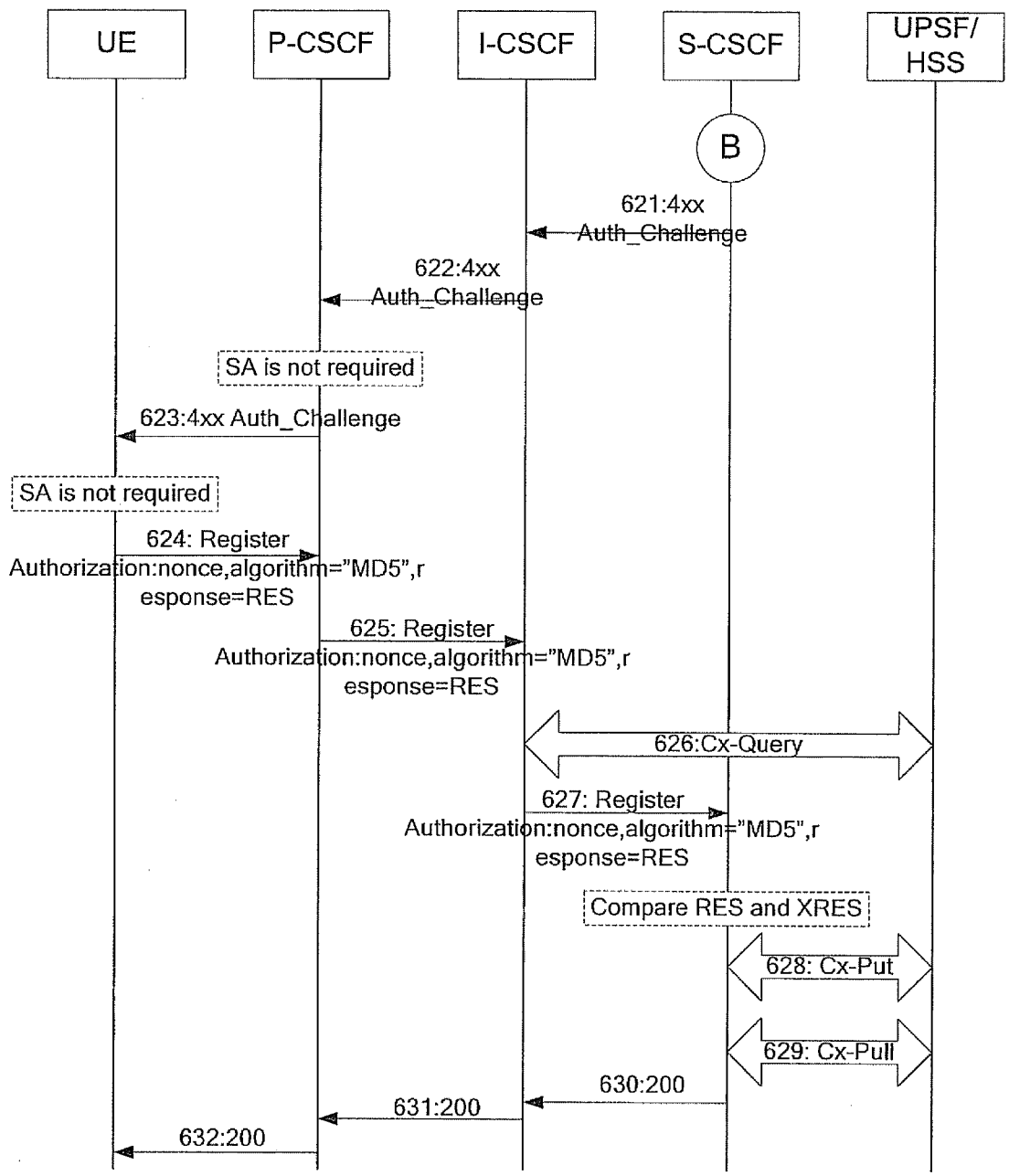

The sixth embodiment, shown in FIGS. 9a and 9b, is in respect of the third embodiment. In the sixth embodiment, the HTTP DIGEST authentication mechanism is adopted after the IMS authentication bundled with NASS is failed.

Referring to FIGS. 9a and 9b, the method of authentication in accordance with the sixth embodiment of the present invention includes:

Block 601: The UE sends a Register message carrying the access network identity and the association information to the P-CSCF.

Block 602: The P-CSCF locates the CLF according to the access network identity in the Register message and the preset corresponding relationship between the CLF and the access network identity.

Block 603: The P-CSCF queries the CLF located in block 602 about the NASS attachment information of the UE in the access layer according to the association information in the Register message. The CLF pre-stores the data record of the NASS attachment information corresponding to the association information, wherein the NASS attachment information includes IP address information, location information, etc., but no bundled indication in the related art. If there is no data record corresponding to the association information, the CLF returns a query failure message to the P-CSCF.

Block 604: The P-CSCF sends to the I-CSCF the Register message carrying the query result in block 603 and the source IP address of the Register message received by the P-CSCF; if the query in block 603 succeeds, the P-CSCF sends the NASS attachment information queried to the I-CSCF; otherwise, the P-CSCF reports a query failure message to the I-CSCF.

Block 605: The I-CSCF interacts with the UPSF or the HSS through a Cx-Selection-Info message to select a corresponding S-CSCF, i.e., the I-CSCF sends a request to the UPSF or the HSS to search the user profile in the UPSF or the HSS to determine the S-CSCF for processing the Register message.

Block 606: The I-CSCF forwards the Register message carrying the query result and the source IP address of the Register message received by the P-CSCF to the S-CSCF determined in the Block 605. If the query succeeds, the query result is the NASS attachment information queried; otherwise, the query result is the query failure message reported.

Block 607: The S-CSCF sends a Cx-Put message to the UPSF or the HSS to update the S-CSCF indication information in the UPSF or the HSS and notify the UPSF or the HSS that it has been assigned to serve this user.

Block 608: The S-CSCF sends an AV-Req message to the UPSF or the HSS requesting the authentication data of the user.

Block 609: The UPSF or the HSS checks the user profile and finds out that the authentication data is configured as the NBA and the HTTP DIGEST authentication mechanisms.

Block 610: The UPSF or the HSS sends an AV-Req-Resp message to the S-CSCF to send the authentication data of the user to the S-CSCF.

Block 611: The S-CSCF stores all the authentication mechanisms and authentication data corresponding to the authentication mechanisms. If the query result is the NASS attachment information, the S-CSCF compares the source IP address of the Register message received by the P-CSCF with the IP address in the NASS attachment information queried from the CLF. If the source IP address of the Register message received by the P-CSCF is consistent with the IP address in the NASS attachment information queried from the CLF, it means that the authentication succeeds, proceed to Block 612, i.e., send an authentication success message to the UE. If the source IP address of the Register message received by the P-CSCF is not consistent with the IP address in the NASS attachment information queried from the CLF, it means that the authentication is failed, proceed to Block 621, i.e., authenticate the user by the HTTP DIGEST authentication mechanism.

If the above query result is the query failure message reported, it also means that the authentication is failed, proceed to Block 621, i.e., authenticate the user by the HTTP DIGEST authentication mechanism.

Block 612: The S-CSCF sends a Cx-Put message to the UPSF or the HSS to update the S-CSCF indication information in the UPSF or the HSS and notify the UPSF or the HSS that it has been assigned to serve this user.

Block 613: The S-CSCF downloads the user profile from the UPSF or the HSS through a Cx-Pull message.

Block 614: The S-CSCF sends a 2xx Auth_OK message to the I-CSCF to indicate that the authentication succeeds.

Block 615: The I-CSCF forwards the 2xx Auth_OK message to the P-CSCF.

Block 616: after receiving the 2xx Auth_OK message, the P-CSCF determines that it did not receive a 4xx Auth_Challenge message before, therefore the P-CSCF needs not establish the security association with the UE; the P-CSCF forwards the 2xx Auth_OK message to the UE; and after receiving the 2xx Auth_OK message, the UE determines that it did not receive the 4xx Auth_Challenge before, so the UE needs not establish the security association with the P-CSCF.

Block 621, as shown in FIG. 9b: since the S-CSCF has stored authentication data obtained from the UPSF or the HSS in the Block 611 corresponding to the HTTP DIGEST authentication mechanism, the S-CSCF sends a 4xx Auth_Challenge message including authentication information of the HTTP DIGEST to the I-CSCF.

Block 622: The I-CSCF forwards the 4xx Auth_Challenge message to the P-CSCF.

Block 623: after receiving the 4xx Auth_Challenge message, the P-CSCF determines that an "algorithm" parameter in a WWW-Authenticate header of the 4xx Auth_Challenge message indicates that the authentication mechanism is the HTTP DIGEST, therefore the P-CSCF need not establish a security association with the UE; the P-CSCF sends the 4xx Auth_Challenge message without the Security-Server header to the UE.

Block 624: after receiving the 4xx Auth_Challenge message, the UE determines that the "algorithm" parameter indicates that the authentication mechanism is the HTTP DIGEST, therefore the UE needs not establish the security association with the P-CSCF; and the UE sends a Register message carrying a authentication parameter to the P-CSCF again.

Block 625: The P-CSCF forwards the Register message carrying the authentication parameter to the I-CSCF.

Block 626: The I-CSCF sends a Cx-Query message to the UPSF or the HSS to determine the S-CSCF for processing the Register message, i.e., the I-CSCF queries the UPSF or the HSS about the S-CSCF which has been assigned to serve this user. The UPSF or the HSS returns the S-CSCF name which was previously selected in block 603 to the I-CSCF according to the S-CSCF indication information stored in the HSS.

Block 627: The I-CSCF forwards the Register message to the S-CSCF determined in the Block 626.

The S-CSCF compares the authentication parameter obtained from the UPSF or the HSS with the authentication parameter sent by the UE; if the authentication parameter obtained from the UPSF or the HSS is consistent with the authentication parameter sent by the UE, it means that the authentication succeeds; otherwise, it means that the authentication is failed.

Block 628: The S-CSCF sends a Cx-Put message to the UPSF or the HSS to update the S-CSCF indication information in the UPSF or the HSS and notify the UPSF or the HSS that it has been assigned to serve this user.

Block 629: The S-CSCF downloads the user profile from the UPSF or the HSS through a Cx-Pull message.

Block 630: The S-CSCF sends a 200 message indicating that the authentication succeeds to the I-CSCF, or a 403 Forbidden message indicating that the authentication is failed to the I-CSCF. For illustrative purpose, only the 200 message sent when the authentication succeeds is shown in FIG. 9b.

Block 631: The I-CSCF forwards the 200 message or 403 Forbidden message to the P-CSCF.

Block 632: The P-CSCF forwards the 200 message or 403 Forbidden message to the UE.

In respect of the fourth or the fifth embodiment, the sixth embodiment may be modified according to the differences between the fourth or the fifth embodiment and the third embodiment, which will not be repeated herein.

Figure 10A:
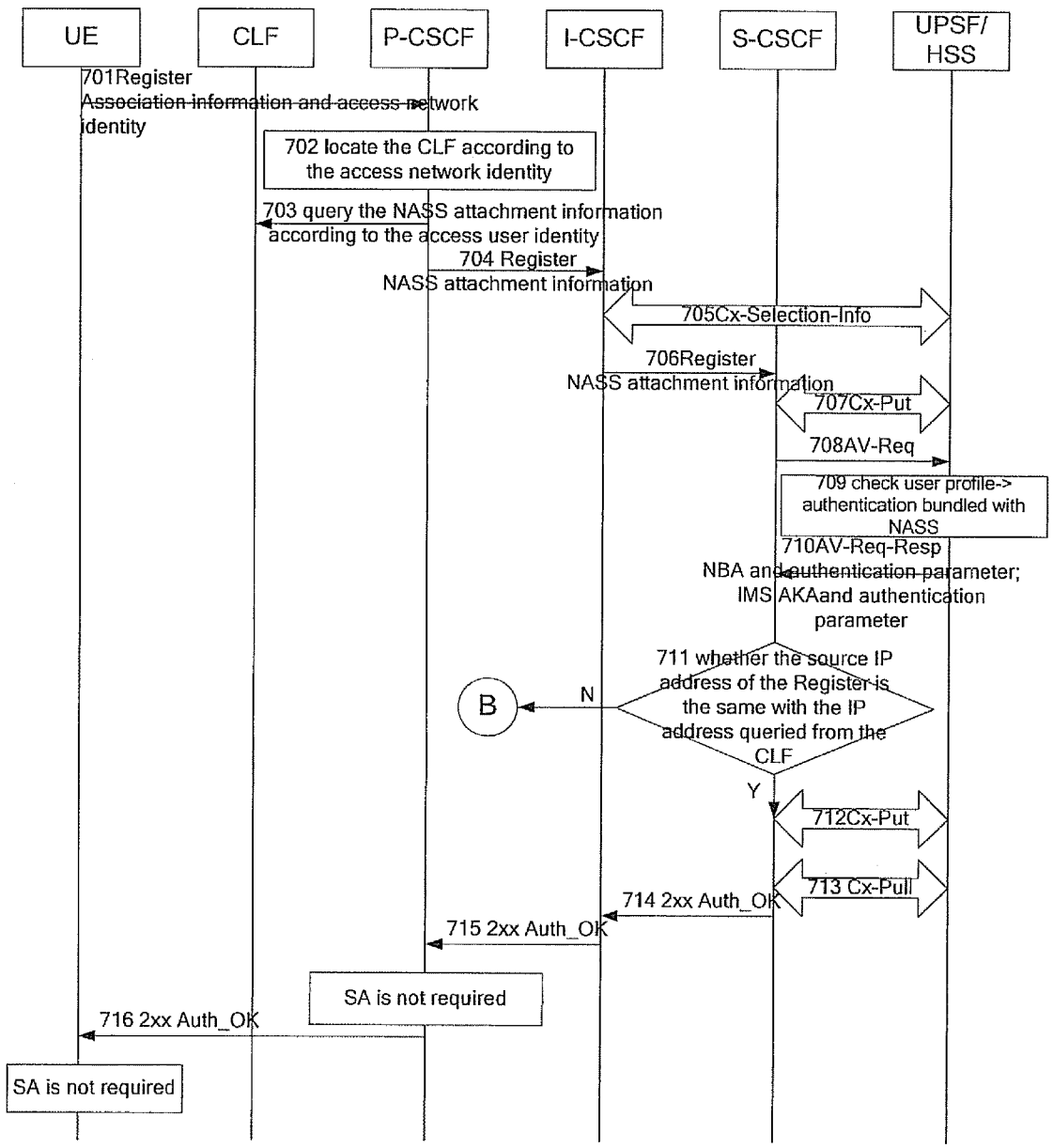
FIGS. 10a and 10b are message flows of an authentication according to a seventh embodiment the present invention.
Figure 10B:
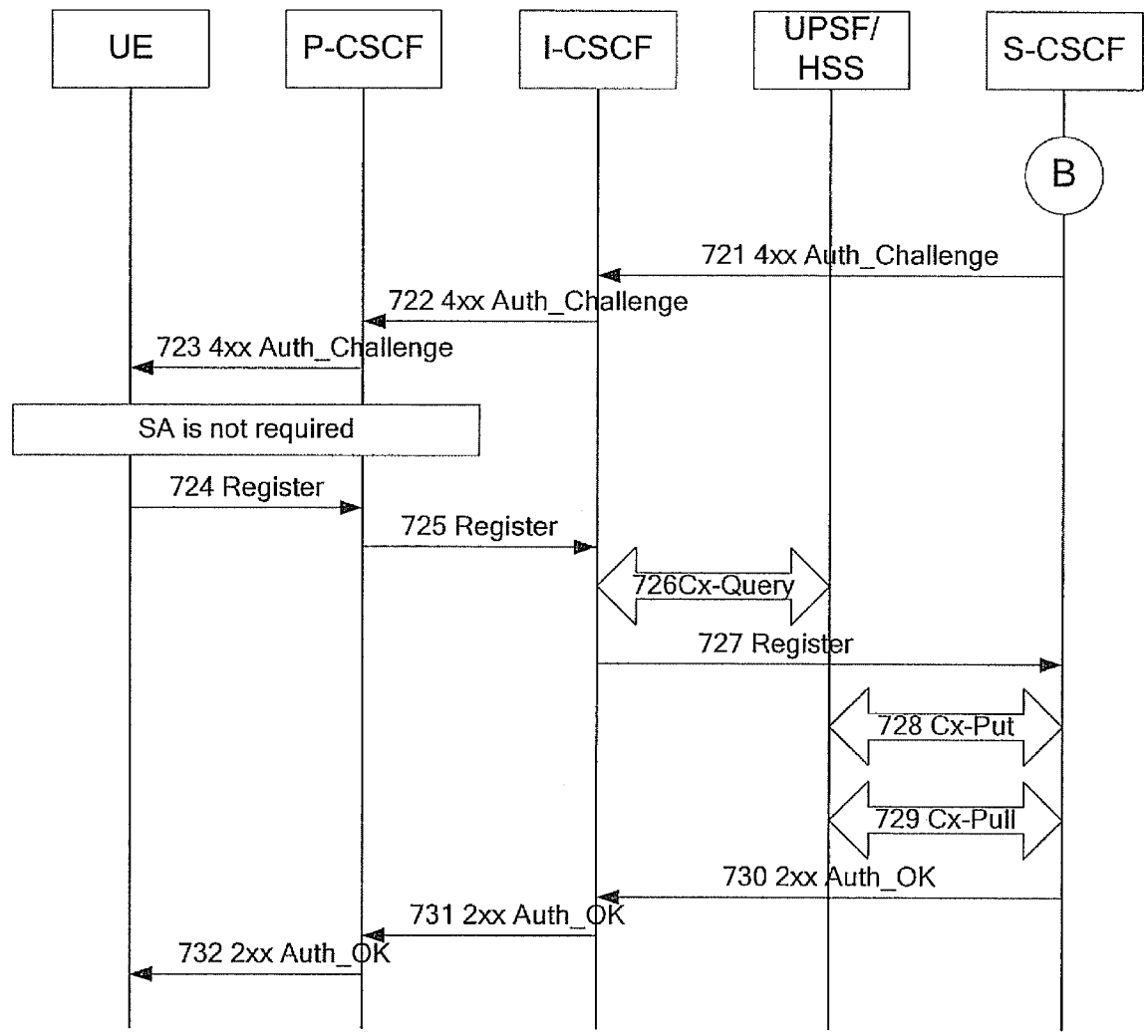

The seventh embodiment, as shown in FIGS. 10a and 10b, in which the IMS AKA authentication mechanism is adopted after the IMS authentication bundled with NASS mechanism is failed.

Referring to FIGS. 10a and 10b, the method of the seventh embodiment in accordance with the present invention includes:

Block 701: The UE sends a Register message carrying the access network identity and the association information to the P-CSCF.

Block 702: The P-CSCF locates the CLF according to the access network identity in the Register message and the preset corresponding relationship between the CLF and the access network identity.

Block 703: The P-CSCF queries the CLF located in block 702 about the NASS attachment information of the UE in the access layer according to the association information in the Register message. The CLF pre-stores the data record of the NASS attachment information corresponding to the association information, wherein the NASS attachment information includes IP address information, location information, etc., but no bundled indication in the related art. If there is no data record corresponding to the association information, the CLF returns a query failure message to the P-CSCF. Block 704: The P-CSCF sends to the I-CSCF the Register message carrying the query result in block 703 and the source IP address of the Register message received by the P-CSCF; if the query in block 703 succeeds, the P-CSCF sends the NASS attachment information to the I-CSCF; otherwise, the P-CSCF reports a query failure message to the I-CSCF.

Block 705: The I-CSCF interacts with the UPSF or the HSS through a Cx-Selection-Info message to select a corresponding S-CSCF, i.e., the I-CSCF sends a request to the UPSF or the HSS to search the user profile in the UPSF or the HSS to select the S-CSCF for processing the Register message.

Block 706: The I-CSCF forwards the Register message carrying the query result and the source IP address of the Register message received by the P-CSCF to the S-CSCF selected in the Block 705. If the query succeeds, the query result is the NASS attachment information; otherwise, the query result is the query failure message reported.

Block 707: The S-CSCF sends a Cx-Put message to the UPSF or the HSS to update the S-CSCF indication information in the UPSF or the HSS and notify the UPSF or the HSS that it has been assigned to serve this user.

Block 708: The S-CSCF sends an AV-Req message to the UPSF or the HSS requesting the authentication data of the user.

Block 709: The UPSF or the HSS detects that authentication data is configured as the NBA and the IMS AKA authentication mechanism.

Block 710: The UPSF or the HSS sends an AV-Req-Resp message to the S-CSCF to send the authentication data of the user to the S-CSCF.

Block 711: The S-CSCF stores all the authentication mechanisms and authentication data corresponding to the authentication mechanisms. If the query result is the NASS attachment information, the S-CSCF compares the source IP address of the Register message received by the P-CSCF with the IP address in the NASS attachment information queried from the CLF. If the source IP address of the Register message received by the P-CSCF is consistent with the IP address in the NASS attachment information queried from the CLF, it means that the authentication succeeds, proceed to Block 712, i.e., send an authentication success message to the UE. If the source IP address of the Register message received by the P-CSCF is not consistent with the IP address in the NASS attachment information queried from the CLF, it means that the authentication is failed, proceed to Block 721, i.e., authenticate the user by the IMS AKA authentication mechanism.

If the above query result is the query failure message reported, it also means that the authentication is failed, proceed to Block 721, i.e., authenticate the user by the IMS AKA authentication mechanism.

Block 712: The S-CSCF sends a Cx-Put message to the UPSF or the HSS to update the S-CSCF indication information in the UPSF or the HSS and notify the UPSF or the HSS that it has been assigned to serve this user.

Block 713: The S-CSCF downloads the user profile from the UPSF or the HSS through a Cx-Pull message.

Block 714: The S-CSCF sends a 2xx Auth_OK message to the I-CSCF indicating that the authentication succeeds.

Block 715: The I-CSCF forwards the 2xx Auth_OK message to the P-CSCF.

Block 716: after receiving the 2xx Auth_OK message, the P-CSCF determines that it did not receive a 4xx Auth_Challenge message before, therefore the P-CSCF needs not establish the security association with the UE; the P-CSCF forwards the 2xx Auth_OK message to the UE; and after receiving the 2xx Auth_OK message, the UE determines that it did not receive the 4xx Auth_Challenge message before, therefore the UE need not establish the security association with the P-CSCF.

Block 721, as shown in FIG. 10b: since the S-CSCF has stored the authentication data obtained from the UPSF or the HSS in the Block 711 corresponding to the IMS AKA authentication mechanism, the S-CSCF sends the 4xx Auth_Challenge message carrying authentication information of the IMS AKA authentication mechanism to the I-CSCF.

Block 722: The I-CSCF forwards the 4xx Auth_Challenge message to the P-CSCF.

Block 723: after receiving the 4xx Auth_Challenge message, the P-CSCF determines that an "algorithm" parameter in a WWW-Authenticate header of the 4xx Auth_Challenge message indicates that the authentication mechanism is the IMS AKA, therefore the P-CSCF needs not establish a security association with the UE; the P-CSCF forwards the 4xx Auth_Challenge message to the UE.

Block 724: after receiving the 4xx Auth_Challenge message, the UE determines that the "algorithm" parameter in the WWW-Authenticate header of the 4xx Auth_Challenge message indicates that the authentication mechanism is the IMS AKA, therefore the UE needs not establish the security association with the P-CSCF; the UE sends a Register message carrying the authentication parameter to the P-CSCF again.

Block 725: The P-CSCF forwards the Register message of the UE to the I-CSCF.

Block 726: The I-CSCF sends a Cx-Query message to the UPSF or the HSS to determine the S-CSCF for processing the Register message, i.e., the I-CSCF queries the UPSF or the HSS about the S-CSCF which has been assigned to serve this user. The UPSF or the HSS returns the S-CSCF name which was previously selected in block 703 to the I-CSCF according to the S-CSCF indication information stored in the HSS.

Block 727: The I-CSCF forwards the Register message to the S-CSCF determined in the Block 726.

The S-CSCF compares the authentication parameter obtained from the UPSF or the HSS with the authentication parameter sent by the UE; if the authentication parameter obtained from the UPSF or the HSS is consistent with the authentication parameter sent by the UE, it means that the authentication succeeds; otherwise, it means that the authentication is failed.

Block 728: The S-CSCF sends a Cx-Put message to the UPSF or the HSS to update the S-CSCF indication information in the UPSF or the HSS and notify the HSS that it has been assigned to serve this user.

Block 729: The S-CSCF downloads the user profile from the HSS through a Cx-Pull message.

Block 730: if the authentication succeeds, the S-CSCF sends a 2xx Auth_OK message to the I-CSCF indicating that the registration succeeds, wherein 2xx indicates that the message is success relevant, and xx is a number within 00~99; if the authentication is failed, the S-CSCF sends a authentication failure message to the I-CSCF.

Block 731: The I-CSCF forwards the 2xx Auth_OK message or authentication failure message to the P-CSCF.

Block 732: The P-CSCF forwards the 2xx Auth_OK message or authentication failure message to the UE.

In respect of the fourth or the fifth embodiment, the method of the seventh embodiment may be modified correspondingly according to the difference between the fourth embodiment and the third embodiment, or the difference between the fifth embodiment and the third embodiment, which will not be repeated herein.

Figure 11A:
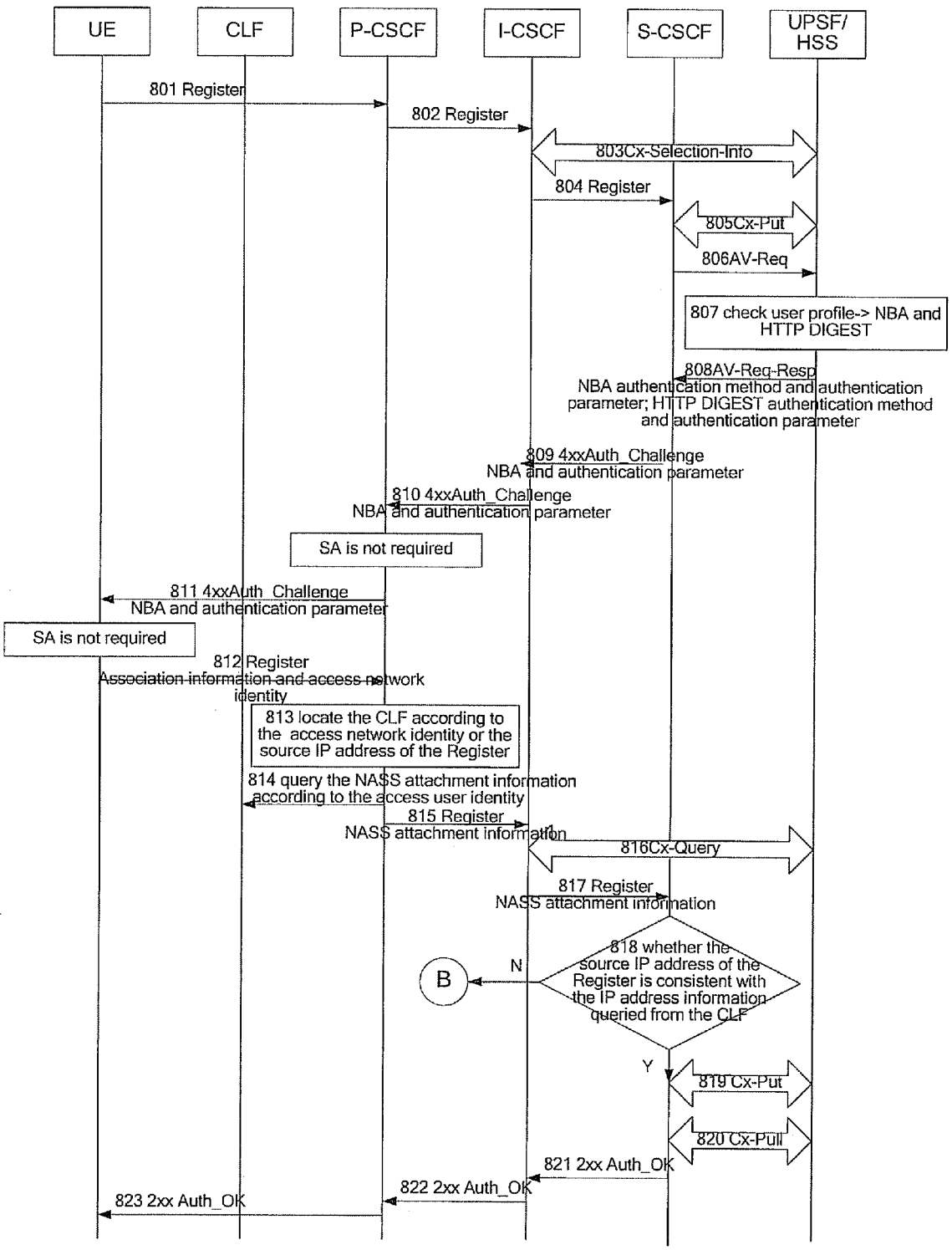
FIGS. 11a and 11b are message flows of an authentication according to an eighth embodiment the present invention.
Figure 11B:
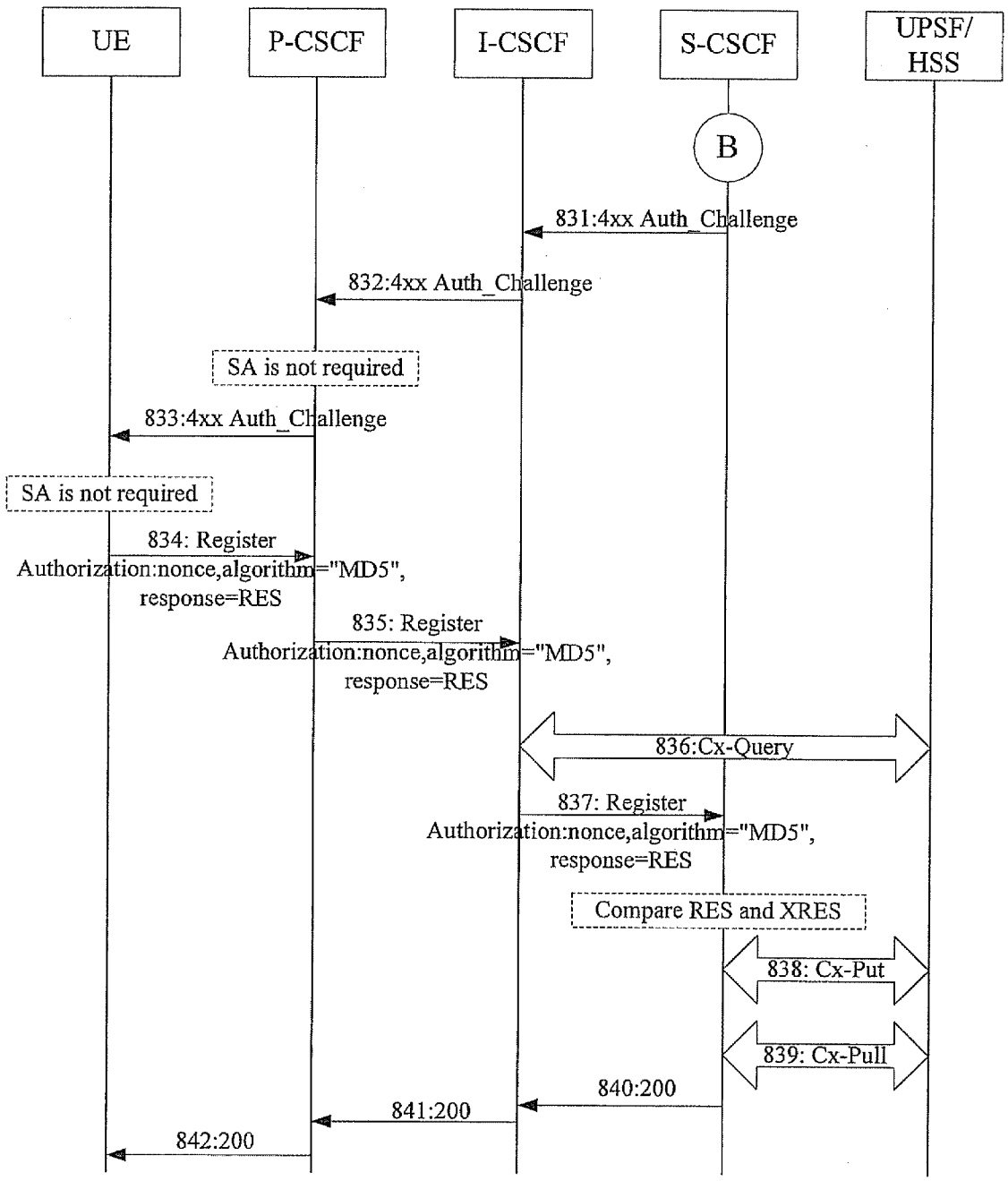

The eighth embodiment, as shown in FIGS. 11a and 11b, is in respect of the first embodiment. In the eighth embodiment, the HTTP DIGEST authentication mechanism is adopted after the IMS authentication bundled with NASS is failed.

Referring to FIGS. 11a and 11b, the method of the eighth embodiment includes:

Block 801: The UE sends a Register message to the P-CSCF.

Block 802: The P-CSCF forwards the Register message of the UE to the I-CSCF.

Block 803: The I-CSCF interacts with the UPSF or the HSS through a Cx-Selection-Info message to select a corresponding S-CSCF, i.e., the I-CSCF sends a request to the UPSF or the HSS to search the user profile in the UPSF or the HSS to select the S-CSCF for processing the Register message.

Block 804: The I-CSCF forwards the Register message of the UE to the S-CSCF selected in the Block 803.

Block 805: The S-CSCF sends a Cx-Put message to the UPSF or the HSS to update the S-CSCF indication information in the UPSF or the HSS and notify the UPSF or the HSS that it has been assigned to serve this user.

Block 806: The S-CSCF sends an AV-Req message to the UPSF or the HSS requesting the authentication data of the user.

Block 807: The UPSF or the HSS detects that the authentication data is configured as the NBA and the HTTP DIGEST authentication mechanisms.

Block 808: The UPSF or the HSS sends an AV-Req-Resp message to send the authentication data of the user to the S-CSCF. The authentication data includes at least the IMS authentication bundled with NASS mechanism and the authentication data corresponding to the IMS authentication bundled with NASS mechanism, the HTTP DIGEST authentication mechanism and the authentication data corresponding to the HTTP DIGEST authentication mechanism.

Block 809: The S-CSCF stores all the authentication mechanisms and the authentication data corresponding to the authentication mechanisms. The default authentication mechanism is the IMS authentication bundled with NASS, and the HTTP DIGEST is used after the default authentication mechanism is failed. The S-CSCF sends a 4xx Auth_Challenge message to the I-CSCF, wherein the authentication header filed of the 4xx Auth_Challenge message indicates that the authentication mechanism is IMS authentication bundled with NASS, i.e., carries an indication of the authentication mechanism.

Block 810: The I-CSCF forwards the 4xx Auth_Challenge message to the P-CSCF.

Block 811: after receiving the 4xx Auth_Challenge message, the P-CSCF determines that an "algorithm" parameter in a WWW-Authenticate header of the 4xx Auth_Challenge message indicates that the authentication mechanism of the user is the IMS authentication bundled with NASS. Therefore, the P-CSCF needs not establish a security association with the UE; the P-CSCF forwards the 4xx Auth_Challenge message carrying the bundled indication but no Security-Server header to the UE.

Block 812: after receiving the 4xx Auth_Challenge message, the UE determines that the "algorithm" parameter in the WWW-Authenticate header of the 4xx Auth_Challenge message indicates that the authentication mechanism of the user is IMS authentication bundled with NASS. Therefore, the UE needs not establish the security association with the P-CSCF; and sends to the P-CSCF another Register message carrying an access network identity and the association information.

Block 813: The P-CSCF locates the CLF according to the access network identity in the Register message and the preset corresponding relationship between the CLF and the access network identity.

Block 814: The P-CSCF queries the CLF located in block 813 about the NASS attachment information of the UE in the access layer according to the association information in the Register message. Different from the related art, the CLF pre-stores data record of the NASS attachment information corresponding to the association information, wherein the NASS attachment information includes IP address information, location information, etc., but no bundled indication in the related art. If there is no data record corresponding to the association information, the CLF returns a query failure message to the P-CSCF.

Block 815: The P-CSCF sends to the I-CSCF the Register message carrying the query result in block 814 and the source IP address of the Register message received by the P-CSCF; if the query in block 814 succeeds, the P-CSCF sends the NASS attachment information to the I-CSCF; otherwise, the P-CSCF reports a query failure message to the I-CSCF.

Block 816: The I-CSCF sends a Cx-Query message to the UPSF or the HSS to determine the S-CSCF for processing the Register message, i.e., the I-CSCF queries the UPSF or the HSS about the S-CSCF which has been assigned to serve this user. The UPSF or the HSS returns the S-CSCF name which was previously selected in block 703 to the I-CSCF according to the S-CSCF indication information stored in the HSS.

Block 817: The I-CSCF forwards the Register message carrying the query result and the source IP address of the Register message received by the P-CSCF to the S-CSCF determined in the Block 816. If the query succeeds, the query result is the NASS attachment information; otherwise, the query result is the query failure message reported.

Block 818: if the query result is the NASS attachment information, the S-CSCF compares the source IP address of the Register message received by the P-CSCF with the IP address in the NASS attachment information queried from the CLF. If the source IP address of the Register message received by the P-CSCF is consistent with the IP address in the NASS attachment information queried from the CLF, it means that the authentication succeeds, proceed to Block 819, i.e., send an authentication success message to the UE; otherwise, it means that the authentication is failed, proceed to Block 831, i.e., send an authentication failure message to the UE.

If the query result is the query failure message reported, it also means that the authentication is failed, proceed to Block 831, i.e., send the authentication failure message to the UE.

Block 819: The S-CSCF sends a Cx-Put message to the UPSF or the HSS to update the S-CSCF indication information in the UPSF or the HSS and notify the UPSF or the HSS that it has been assigned to serve this user.

Block 820: The S-CSCF downloads the user profile from the UPSF or the HSS through a Cx-Pull message.

Block 821: The S-CSCF sends a 2xx Auth_OK message to the I-CSCF indicating that the authentication succeeds.

Block 822: The I-CSCF forwards the 2xx Auth_OK message to the P-CSCF.

Block 823: The P-CSCF forwards the 2xx Auth_OK message to the UE.

Block 831, as shown in FIG. 11b: since the S-CSCF has stored the authentication data obtained from the UPSF or the HSS in the Block 809 corresponding to the HTTP DIGEST authentication mechanism, the S-CSCF sends the 4xx Auth_Challenge message carrying the HTTP DIGEST authentication information to the I-CSCF.

Block 832: The I-CSCF forwards the 4xx Auth_Challenge message to the P-CSCF.

Block 833: after receiving the 4xx Auth_Challenge message, the P-CSCF determines that the "algorithm" parameter in a WWW-Authenticate header of the 4xx Auth_Challenge message indicates that the authentication mechanism is the HTTP DIGEST, therefore the P-CSCF needs not establish the security association with the UE; and the P-CSCF sends the 4xx Auth_Challenge message without the Security-Server header to the UE.

Block 834: after receiving the 4xx Auth_Challenge message, the UE determines that the "algorithm" parameter indicates that the authentication mechanism is the HTTP DIGEST, therefore the UE needs not establish the security association with the P-CSCF; and the UE sends a Register message carrying an authentication parameter to the P-CSCF again.

Block 835: The P-CSCF forwards the Register message carrying the authentication parameter to the I-CSCF.

Block 836: The I-CSCF sends a Cx-Query message to the UPSF or the HSS to determine the S-CSCF for processing the Register message, i.e., the I-CSCF queries the UPSF or the HSS about the S-CSCF which has been assigned to serve this user. The UPSF or the HSS returns the S-CSCF name which was previously selected in block 803 to the I-CSCF according to the S-CSCF indication information stored in the HSS.

Block 837: The I-CSCF forwards the Register message to the S-CSCF determined in the Block 836.

The S-CSCF compares the authentication parameter obtained from the UPSF or the HSS with the authentication parameter sent by the UE; if the authentication parameter obtained from the UPSF or the HSS is consistent with the authentication parameter sent by the UE, it means that the authentication succeeds; otherwise, it means that the authentication is failed.

Block 838: The S-CSCF sends a Cx-Put message to the UPSF or the HSS to update the S-CSCF indication information in the UPSF or the HSS and notify the UPSF or the HSS that it has been assigned to serve this user.

Block 839: The S-CSCF downloads the user profile from the UPSF or the HSS through a Cx-Pull message.

Block 840: The S-CSCF sends a 200 message indicating that the authentication succeeds to the I-CSCF, or a 403 Forbidden message indicating that the authentication is failed to the I-CSCF. For illustrative purpose, only the 200 message sent when the authentication succeeds is shown in FIG. 10b.

Block 841: The I-CSCF forwards the 200 message or 403 Forbidden message to the P-CSCF.

Block 842: The P-CSCF forwards the 200 message or 403 Forbidden message to the UE.

In respect of the second embodiment, the method of the eighth embodiment may be modified correspondingly according to the difference between the second embodiment and the first embodiment, which will not be repeated herein.

Figure 12A:
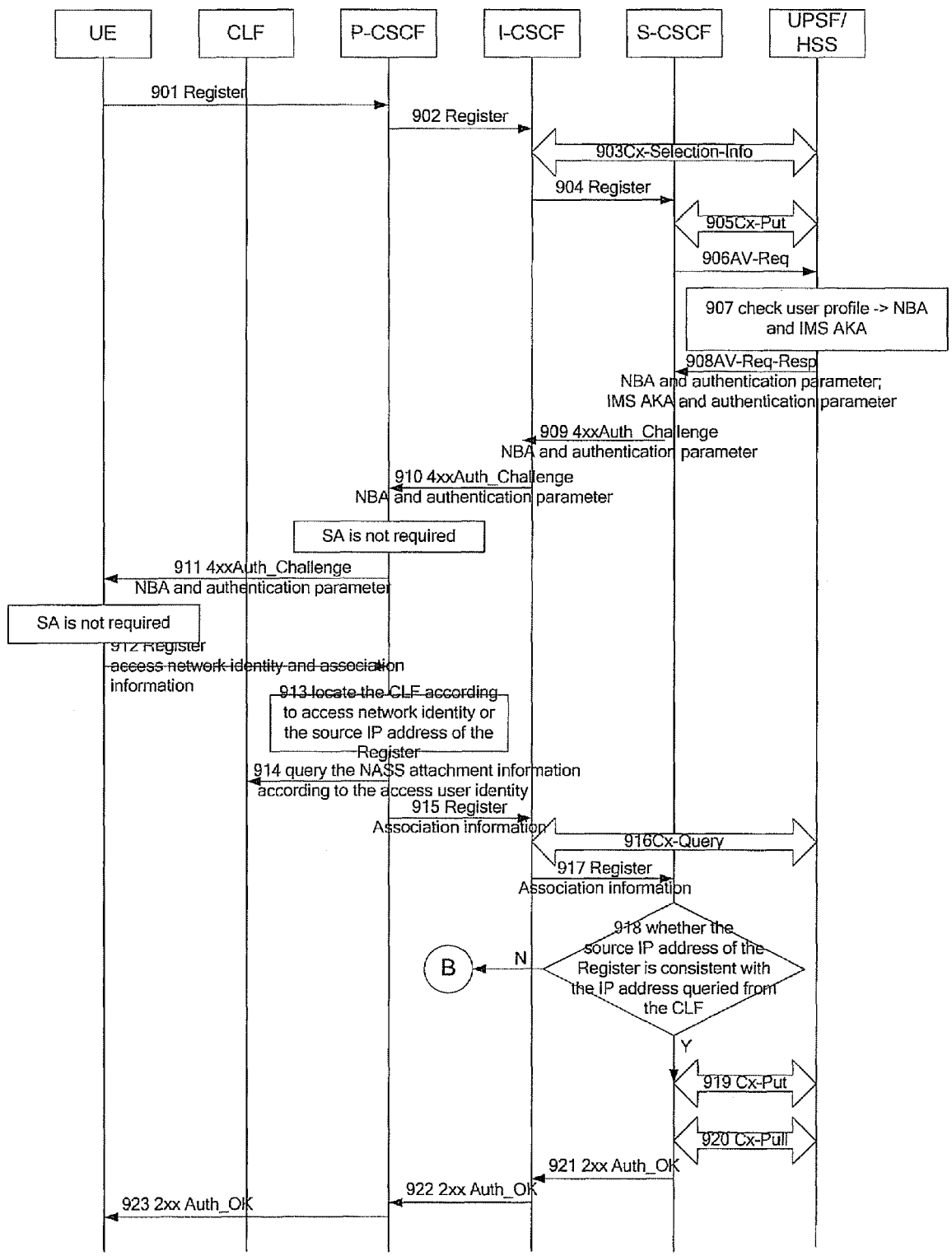
FIGS. 12a and 12b are message flows of an authentication according to a ninth embodiment the present invention.
Figure 12B:
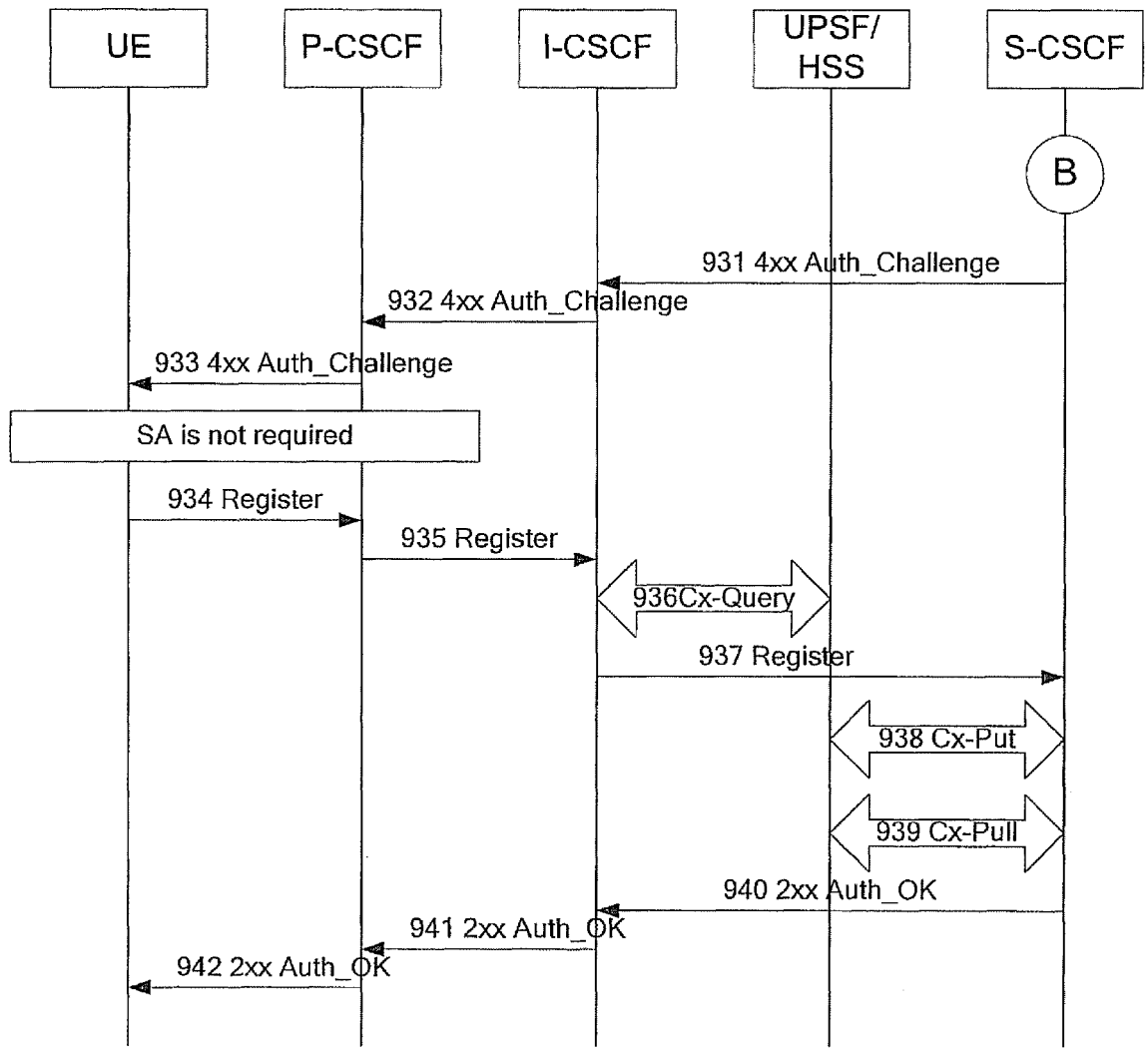

The ninth embodiment, as shown in FIGS. 12a and 12b, is in respect of the first embodiment. In the ninth embodiment, the IMS AKA authentication mechanism is adopted after the IMS authentication bundled with NASS is failed.

Referring to FIGS. 12a and 12b, the method of the ninth embodiment includes:

Block 901: The UE sends a Register message to the P-CSCF.

Block 902: The P-CSCF forwards the Register message of the UE to the I-CSCF.

Block 903: The I-CSCF interacts with the UPSF or the HSS through a Cx-Selection-Info message to select a corresponding S-CSCF, i.e., the I-CSCF sends a request to the UPSF or the HSS to search the user profile in the UPSF or the HSS to select which S-CSCF will process the Register message.

Block 904: The I-CSCF forwards the Register message of the UE to the S-CSCF selected in the Block 903.

Block 905: The S-CSCF sends a Cx-Put message to the UPSF or the HSS to update the S-CSCF indication information in the UPSF or the HSS and notify the UPSF or the HSS that it has been assigned to serve this user.

Block 906: The S-CSCF sends an AV-Req message to the UPSF or the HSS requesting the authentication data of the user.

Block 907: The UPSF or the HSS checks the user profile and determines that the authentication data is configured as the NBA and the IMS AKA authentication mechanisms.

Block 908: The UPSF or the HSS sends an AV-Req-Resp message to send the authentication data of the user to the S-CSCF. The authentication data includes at least the IMS authentication bundled with NASS mechanism and the authentication data corresponding to the IMS authentication bundled with NASS mechanism, the IMS AKA authentication mechanism and the authentication data corresponding to the IMS AKA authentication mechanism.

Block 909: The S-CSCF stores all the authentication mechanisms and the authentication data corresponding to the authentication mechanisms. The default authentication mechanism of the user is the IMS authentication bundled with NASS mechanism, after the default authentication mechanism is failed, the IMS AKA is used. The S-CSCF sends a 4xx Auth_Challenge message to the I-CSCF, wherein the authentication header filed of the 4xx Auth_Challenge message indicates that the authentication mechanism is the IMS authentication bundled with NASS, i.e., carries the indication of the authentication mechanism.

Block 910: The I-CSCF forwards the 4xx Auth_Challenge message to the P-CSCF.

Block 911: after receiving the 4xx Auth_Challenge, the P-CSCF determines that the "algorithm" parameter in the WWW-Authenticate header of the 4xx Auth_Challenge indicates that the authentication mechanism of the user is IMS authentication bundled with NASS. Therefore, the P-CSCF needs not establish the security association with the UE, and forwards the 4xx Auth_Challenge message carrying the bundled indication but no Security-Server header to the UE.

Block 912: after receiving the 4xx Auth_Challenge message, the UE determines that the "algorithm" parameter in the WWW-Authenticate header of the 4xx Auth_Challenge message indicates that the authentication mechanism of the user is IMS authentication bundled with NASS. Therefore, the UE needs not establish the security association with the P-CSCF; and sends to the P-CSCF another Register message carrying the access network identity and the association information.

Block 913: The P-CSCF locates the CLF according to the access network identity in the Register message and the preset corresponding relationship between the CLF and the access network identity.

Block 914: The P-CSCF queries the CLF located in block 913 about the NASS attachment information of the UE in the access layer according to the association information in the Register message. Different from the related art, the CLF pre-stores data record of the NASS attachment information corresponding to the association information, wherein the NASS attachment information includes IP address information, location information, etc., but no bundled indication in the related art. If there is no data record corresponding to the association information, the CLF returns a query failure message to the P-CSCF.

Block 915: The P-CSCF sends to the I-CSCF the Register message carrying the query result in block 914 and the source IP address of the Register message received by the P-CSCF; if the query in block 914 succeeds, the P-CSCF sends the NASS attachment information to the I-CSCF; otherwise, the P-CSCF reports a query failure message to the I-CSCF.

Block 916: The I-CSCF sends a Cx-Query message to the UPSF or the HSS to determine the S-CSCF for processing the Register message, i.e., the I-CSCF queries the UPSF or the HSS about the S-CSCF which has been assigned to serve this user. The UPSF or the HSS returns the S-CSCF name which was previously selected in block 903 to the I-CSCF according to the S-CSCF indication information stored in the HSS.

Block 917: The I-CSCF forwards the Register message carrying the query result and the source IP address of the Register message received by the P-CSCF to the S-CSCF determined in the Block 916. If the query succeeds, the query result is the NASS attachment information; otherwise, the query result is the query failure message reported.

Block 918: if the query result is the NASS attachment information, the S-CSCF compares the source IP address of the Register message received by the P-CSCF with the IP address in the NASS attachment information queried from the CLF. If the source IP address of the Register message received by the P-CSCF is consistent with the IP address in the NASS attachment information queried from the CLF, it means that the authentication succeeds, proceed to Block 919, i.e., send an authentication success message to the UE; otherwise, it means that the authentication is failed, proceed to Block 931, i.e., send an authentication failure message to the UE.

If the query result is the query failure message reported, it also means that the authentication is failed, proceed to Block 931, i.e., send the authentication failure message to the UE.

Block 919: The S-CSCF sends a Cx-Put message to the UPSF or the HSS to update the S-CSCF indication information in the UPSF or the HSS and notify the UPSF or the HSS that it has been assigned to serve this user.

Block 920: The S-CSCF downloads the user profile from the UPSF or the HSS through a Cx-Pull message.

Block 921: The S-CSCF sends a 2xx Auth_OK message to the I-CSCF indicating that the authentication succeeds.

Block 922: The I-CSCF forwards the 2xx Auth_OK message to the P-CSCF.

Block 923: The P-CSCF forwards the 2xx Auth_OK message to the UE.

Block 931, as shown in FIG. 12b, since the S-CSCF has stored the authentication data obtained from the UPSF or the HSS in the Block 909 corresponding to the IMS AKA authentication mechanism, the S-CSCF sends a 4xx Auth_Challenge message carrying the information related to the IMS AKA authentication to the I-CSCF.

Block 932: The I-CSCF forwards the 4xx Auth_Challenge message to the P-CSCF.

Block 933: after receiving the 4xx Auth_Challenge message, the P-CSCF determines that the "algorithm" parameter in the WWW-Authenticate header of the 4xx Auth_Challenge message indicates that the authentication mechanism is the IMS AKA, therefore the P-CSCF need not establish a security association with the UE; the P-CSCF forwards the 4xx Auth_Challenge message to the UE.

Block 934: after receiving the 4xx Auth_Challenge message, the UE determines that the "algorithm" parameter in the WWW-Authenticate header of the 4xx Auth_Challenge message indicates that the authentication mechanism is the IMS AKA, therefore the UE need not establish the security association with the P-CSCF; the UE sends a Register message carrying the authentication parameter to the P-CSCF again.

Block 935: The P-CSCF forwards the Register message of the UE to the I-CSCF.

Block 936: The I-CSCF sends a Cx-Query message to the UPSF or the HSS to determine the S-CSCF for processing the Register message, i.e., the I-CSCF queries the UPSF or the HSS about the S-CSCF which has been assigned to serve this user. The UPSF or the HSS returns the S-CSCF name which was previously selected in block 903 to the I-CSCF according to the S-CSCF indication information stored in the HSS.

Block 937: The I-CSCF forwards the Register message to the S-CSCF determined in the Block 926.

The S-CSCF compares the authentication parameter obtained from the UPSF or the HSS with the authentication parameter sent by the UE; if the authentication parameter obtained from the UPSF or the HSS is consistent with the authentication parameter sent by the UE, it means that the authentication succeeds; otherwise, it means that the authentication is failed.

Block 938: The S-CSCF sends a Cx-Put message to the UPSF or the HSS to update the S-CSCF indication information in the UPSF or the HSS and notify the HSS that it has been assigned to serve this user.

Block 939: The S-CSCF downloads the user profile from the UPSF or the HSS through a Cx-Pull message.

Block 940: if the authentication succeeds, the S-CSCF sends a 2xx Auth_OK message to the I-CSCF indicating that the registration succeeds, wherein 2xx indicates that the message is success relevant, and xx is a number within 00~99; if the authentication is failed, the S-CSCF sends a authentication failure message to the I-CSCF.

Block 941: The I-CSCF forwards the 2xx Auth_OK message or authentication failure message to the P-CSCF.

Block 942: The P-CSCF forwards the 2xx Auth_OK message or authentication failure message to the UE.

In respect of the second embodiment, the method of the ninth embodiment may be modified correspondingly according to the difference between the second embodiment and the first embodiment, which will not be repeated herein.

The foregoing description is only the preferred embodiments of the present invention and is not for use in limiting the protection scope thereof. All the modifications, equivalent replacements or improvements in the scope of the spirit and principles of the present invention should be included in the protection scope of the present invention.

What is claimed is:

1. A method of authentication in an IP Multimedia Subsystem (IMS), comprising:
after receiving a Register message from a User Equipment (UE), locating, by a Proxy-Call Session Control Function (P-CSCF), a Connection Location Function (CLF) according to information contained in the Register message and a pre-configured corresponding relationship between the information contained in the Register message and the CLF;
obtaining, by the P-CSCF, a query result by querying the CLF about attachment information of the UE in an access network, and sending the Register message carrying the query result to an Interrogating-Call Session Control Function (I-CSCF);
forwarding, by the I-CSCF, the Register message carrying the query result to a Service-Call Session Control Function (S-CSCF);
authenticating, by the S-CSCF, the UE according to an authentication mechanism obtained from a User Profile Service Function (UPSF) or a Home Subscriber Server (HSS), and sending an authentication result to the UE.

2. The method of claim 1, wherein the authentication mechanism is Network Attach Sub System (NASS) Bundled Authentication (NBA).

3. The method of claim 2, further comprising:
before sending the authentication result to the UE, requesting, by the S-CSCF, the UPSF or the HSS for authentication data of the UE;
determining, by the UPSF or the HSS, that the authentication mechanism of the user is the NBA according to a pre-configured user profile, and sending a message containing the authentication data to the S-CSCF.

4. The method of claim 2, wherein the information contained in the Register message is an access network identity or a source IP address of the Register message.

5. The method of claim 2, wherein the Register message comprises association information of the UE in the access network; and the CLF pre-stores the attachment information of the UE in the access network corresponding to the association information;
the querying the CLF about attachment information of the UE in an access network to obtain a query result comprises:
querying, by the P-CSCF, the CLF about the attachment information of the UE in the access network according to the association information;
if there is attachment information of the UE in the access network containing an IP address corresponding to the association information, returning, by the CLF, the query result comprising the IP address to the P-CSCF; otherwise, returning the query result indicating that the query is failed to the P-CSCF.

6. The method of claim 2, wherein the sending the Register message carrying the query result to an I-CSCF further comprises:
sending, by the P-CSCF, a source IP address of the Register message to the I-CSCF;
the forwarding the Register message carrying the query result to an S-CSCF further comprises:
forwarding, by the I-CSCF, the source IP address of the Register message to the S-CSCF;
the authenticating the UE according to an authentication mechanism obtained from the UPSF or the HSS comprises:
if the query result comprises an IP address, comparing, by the S-CSCF, the source IP address of the Register message received by the P-CSCF with the IP address in the query result; if the source IP address of the Register message received by the P-CSCF is consistent with the IP address in the query result, it indicates that the authentication succeeds; otherwise, it indicates that the authentication is failed.

7. The method of claim 5, wherein the sending the Register message carrying the query result to an I-CSCF further comprises:
sending, by the P-CSCF, a source IP address of the Register message to the I-CSCF;
the forwarding the Register message carrying the query result to an S-CSCF further comprises:
forwarding, by the I-CSCF, the source IP address of the Register message to the S-CSCF;
the authenticating the UE according to an authentication mechanism obtained from the UPSF or the HSS comprises:
if the query result comprises an IP address, comparing, by the S-CSCF, the source IP address of the Register message received by the P-CSCF with the IP address in the query result; if the source IP address of the Register message received by the P-CSCF is consistent with the IP address in the query result, it indicates that the authentication succeeds; otherwise, it indicates that the authentication is failed.

8. The method of claim 2, wherein association information of the UE in the access network corresponding to a source IP address of the Register message is pre-stored in the CLF; and
the querying the CLF about attachment information of the UE in an access network to obtain a query result comprises:
querying, by the P-CSCF, the CLF about the association information according to the source IP address of the Register message;
if there is association information corresponding to the source IP address of the Register message in the CLF, returning, by the CLF, the query result comprising the association information to the P-CSCF; otherwise, returning, by the CLF, the query result indicating that the query is failed to the P-CSCF.

9. The method of claim 2, further comprising:
before the authenticating the UE according to an authentication mechanism obtained from the UPSF or the HSS, obtaining, by the S-CSCF, association information pre-stored in the UPSF or the HSS; and
the authenticating the UE according to an authentication mechanism obtained from the UPSF or the HSS comprises:
if the query result comprises association information of the UE in the access network, comparing, by the S-CSCF, the association information obtained from the UPSF or the HSS with the association information in the query result; if the association information obtained from the UPSF or the HSS is consistent with the association information in the query result, it indicates that the authentication succeeds; otherwise, it indicates that the authentication is failed.

10. The method of claim 8, further comprising:
before the authenticating the UE according to an authentication mechanism obtained from the UPSF or the HSS, obtaining, by the S-CSCF, association information pre-stored in the UPSF or the HSS; and
the authenticating the UE according to an authentication mechanism obtained from the UPSF or the HSS comprises:
if the query result comprises association information of the UE in the access network, comparing, by the S-CSCF, the association information obtained from the UPSF or the HSS with the association information in the query result; if the association information obtained from the UPSF or the HSS is consistent with the association information in the query result, it indicates that the authentication succeeds; otherwise, it indicates that the authentication is failed.

11. The method of claim 9, wherein the association information is the access user identity or location information.

12. The method of claim 10, wherein the association information is the access user identity or location information.

13. The method of claim 1, wherein the authenticating the UE according to an authentication mechanism obtained from the UPSF or the HSS comprises:
storing, by the S-CSCF, the authentication mechanism of the IMS authentication bundled with NASS and corresponding authentication data obtained from the UPSF or the HSS, and a second authentication mechanism and authentication data corresponding to the second authentication mechanism;
authenticating, by the S-CSCF, the UE by the IMS authentication bundled with NASS to obtain a first authentication result; if the authentication succeeds, sending the first authentication result to the UE; otherwise, authenticating, by the S-CSCF, the UE by the second authentication mechanism to obtain a second authentication result, and sending the second authentication result to the UE.

14. The method of claim 13, wherein the authentication mechanism obtained from the UPSF or the HSS comprises: the IMS authentication bundled with NASS, and the second authentication mechanism which is adopted when the IMS authentication bundled with NASS is failed.

15. The method of claim 13, wherein the second authentication mechanism is HTTP DIGEST.

16. The method of claim 15, wherein the authenticating the UE according to an authentication mechanism obtained from the UPSF or the HSS and sending an authentication result to the UE comprises:
sending, by the S-CSCF, a challenge message comprising the HTTP DIGEST authentication mechanism to the UE;
after receiving the challenge message comprising the HTTP DIGEST authentication mechanism, sending, by the UE, a Register message comprising an authentication parameter to the S-CSCF;
authenticating, by the S-CSCF, the UE by the HTTP DIGEST mechanism; if the authentication succeeds, sending, by the S-CSCF, an authentication success message to the UE; otherwise, sending, by the S-CSCF, an authentication failure message to the UE.

17. The method of claim 13, wherein the second authentication mechanism is IMS AKA.

18. The method of claim 17, wherein the authenticating the UE according to an authentication mechanism obtained from the UPSF or the HSS and sending an authentication result to the UE comprises:
sending, by the S-CSCF, a challenge message containing the IMS AKA authentication mechanism to the UE;
after receiving the challenge message containing the IMS AKA authentication mechanism, sending, by the UE, a Register message comprising an authentication parameter to the S-CSCF;
authenticating, by the S-CSCF, the UE by the IMS AKA authentication mechanism; if the authentication succeeds, sending, by the S-CSCF, an authentication success message to the UE; otherwise, sending, by the S-CSCF, an authentication failure message to the UE.

19. The method of claim 2, further comprising:
before the locating a CLF according to information contained in the Register message and a pre-configured corresponding relationship between the information contained in the Register message and the CLF,
sending, by the UE, a Register message to the S-CSCF;
requesting, by the S-CSCF, authentication data of the UE from the UPSF or the HSS;
sending, by the UPSF or the HSS, the authentication mechanism to the S-CSCF according to the pre-configured user profile;
sending, by the S-CSCF, a message comprising the authentication mechanism to the UE;
after receiving the message comprising the authentication mechanism, sending, by the UE, another Register message to the P-CSCF.

20. The method of claim 13, further comprising:
before the locating a CLF according to information contained in the Register message and a pre-configured corresponding relationship between the information contained in the Register message and the CLF,
sending, by the UE, a Register message to the S-CSCF;
requesting, by the S-CSCF, authentication data of the UE from the UPSF or the HSS;
sending, by the UPSF or the HSS, the authentication mechanism to the S-CSCF according to the pre-configured user profile;
sending, by the S-CSCF, a message comprising the authentication mechanism to the UE;
after receiving the message comprising the authentication mechanism, sending, by the UE, another Register message to the P-CSCF.

* * * * *